(12) United States Patent
Bocock et al.

(10) Patent No.: US 11,553,572 B2
(45) Date of Patent: Jan. 10, 2023

(54) POWER CONVERTER CIRCUIT FOR A LIGHTING DEVICE

(71) Applicant: Lutron Technology Company LLC, Coopersburg, PA (US)

(72) Inventors: Ryan M. Bocock, Austin, TX (US); Quinn Brogan, Hellertown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 119 days.

(21) Appl. No.: 17/219,071

(22) Filed: Mar. 31, 2021

(65) Prior Publication Data
US 2021/0307142 A1    Sep. 30, 2021

Related U.S. Application Data

(60) Provisional application No. 63/003,165, filed on Mar. 31, 2020, provisional application No. 63/108,100, filed on Oct. 30, 2020.

(51) Int. Cl.
*H05B 45/30* (2020.01)
*H05B 45/385* (2020.01)
*H05B 45/375* (2020.01)

(52) U.S. Cl.
CPC ......... *H05B 45/385* (2020.01); *H05B 45/375* (2020.01)

(58) Field of Classification Search
CPC ...... H05B 45/37; H05B 45/39; H05B 45/375; H05B 45/382; H05B 45/385; H05B 45/3725
See application file for complete search history.

(56) References Cited

U.S. PATENT DOCUMENTS

| | | | | |
|---|---|---|---|---|
| 7,902,771 | B2* | 3/2011 | Shteynberg | H05B 45/46 |
| | | | | 315/192 |
| 8,106,596 | B2* | 1/2012 | Chang | H05B 45/14 |
| | | | | 315/307 |
| 9,332,598 | B1 | 5/2016 | Ho et al. | |
| 9,392,660 | B2 | 7/2016 | Dias et al. | |
| 9,392,663 | B2 | 7/2016 | Knapp et al. | |
| 9,485,813 | B1 | 11/2016 | Lewis et al. | |
| 9,736,895 | B1 | 8/2017 | Dong et al. | |
| 10,638,562 | B2* | 4/2020 | Huang | H05B 45/355 |
| 2009/0206776 | A1* | 8/2009 | Inaba | H05B 45/12 |
| | | | | 315/307 |

(Continued)

*Primary Examiner* — Tung X Le
(74) *Attorney, Agent, or Firm* — Flaster Greenberg, P.C.

(57) ABSTRACT

A power converter circuit may include a control circuit configured to generate a drive signal for rendering a semiconductor switch conductive and non-conductive to generate a bus voltage across a bus capacitor. The control circuit may adjust a minimum operating period of the drive signal to a first value when an output power of the power converter circuit is greater than a first threshold and to a second value when the output power is less than a second threshold. The control circuit may comprise a comparator that generates the drive signal in response to a sense voltage and a threshold voltage. When operating in a standby mode, the control circuit may adjust a magnitude of the threshold voltage based on an instantaneous magnitude of an alternating-current line voltage received by the power converter circuit, such that an input current drawn by the power converter circuit is sinusoidal.

20 Claims, 11 Drawing Sheets

(56) References Cited

U.S. PATENT DOCUMENTS

| | | | |
|---|---|---|---|
| 2011/0285301 A1* | 11/2011 | Kuang | H05B 45/10 |
| | | | 315/200 R |
| 2013/0134894 A1 | 5/2013 | Kuang | |
| 2015/0311810 A1* | 10/2015 | Chen | H02M 1/08 |
| | | | 363/21.13 |
| 2015/0382422 A1 | 12/2015 | Ho et al. | |
| 2019/0222124 A1* | 7/2019 | Chen | H02M 3/33515 |

* cited by examiner

POWER CONVERTER CIRCUIT FOR A LIGHTING DEVICE

CROSS-REFERENCE TO RELATED APPLICATIONS

This application claims the benefit of U.S. Provisional Patent Application No. 63/003,165, filed Mar. 31, 2020, and U.S. Provisional Patent Application No. 63/108,100, filed Oct. 30, 2020, the contents of which are incorporated herein by reference in their entirety.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity or dimming level) and/or color of the illumination to be changed to a particular set point. These tunable illumination devices may all produce the same color and color rendering index (CRI) when set to a particular dimming level and chromaticity setting (e.g., color set point) on a standardized chromaticity diagram.

SUMMARY

As described herein, a lighting device, such a light-emitting diode (LED) illumination device, may comprise a power converter circuit configured to receive an alternating-current (AC) line voltage and generate a bus voltage, and a load regulation circuit (e.g., an LED drive circuit) for controlling one or more light sources (e.g., LED light sources). The power converter circuit may comprise a bus capacitor configured to store the bus voltage, a semiconductor switch configured to be rendered conductive and non-conductive to charge the bus capacitor, and a control circuit configured to generate a drive signal for rendering the semiconductor switch conductive and non-conductive. The control circuit may be configured to limit an operating period of the drive signal to a minimum operating period. In addition, the power converter circuit may comprise a sense resistor coupled in series with the semiconductor switch and configured to generate a sense voltage having a magnitude that indicates a magnitude of current conducted through the semiconductor switch when the semiconductor switch is conductive.

The control circuit may be configured to determine an output power of the power converter circuit (e.g., based on a current conducted by the LED light sources and a magnitude of the bus voltage). The control circuit may be further configured to adjust the minimum operating period to a first value when the output power is greater than a first threshold and to a second value when the output power is less than a second threshold. In addition, the control circuit may be configured to adjust the minimum operating period with respect to time in a range between a high value and a low value.

The control circuit may also comprise a comparator configured to generate the drive signal. The comparator may receive the sense voltage at a negative input and a threshold voltage at a positive input. The comparator may render the semiconductor switch conductive when the magnitude of the sense voltage is less than the threshold voltage, and render the semiconductor switch non-conductive when the magnitude of the sense voltage exceeds the threshold voltage. The control circuit may operate the power converter circuit in a standby mode when the LED light sources are off. During the standby mode, the control circuit may enable and disable the operation of the power converter circuit to control the magnitude of the bus voltage between a maximum bus voltage threshold and a minimum bus voltage threshold. When the power converter circuit is enabled in the standby mode, the control circuit may adjust the magnitude of the threshold voltage based on an instantaneous magnitude of the AC line voltage, such that an input current drawn by the power converter circuit is sinusoidal.

BRIEF DESCRIPTION OF THE DRAWINGS

FIG. 9 shows example waveforms illustrating the operation of a power converter circuit in the standby mode during a single half-cycle of the AC line voltage when using a variable magnitude for the threshold voltage.

DETAILED DESCRIPTION

Figure 1:
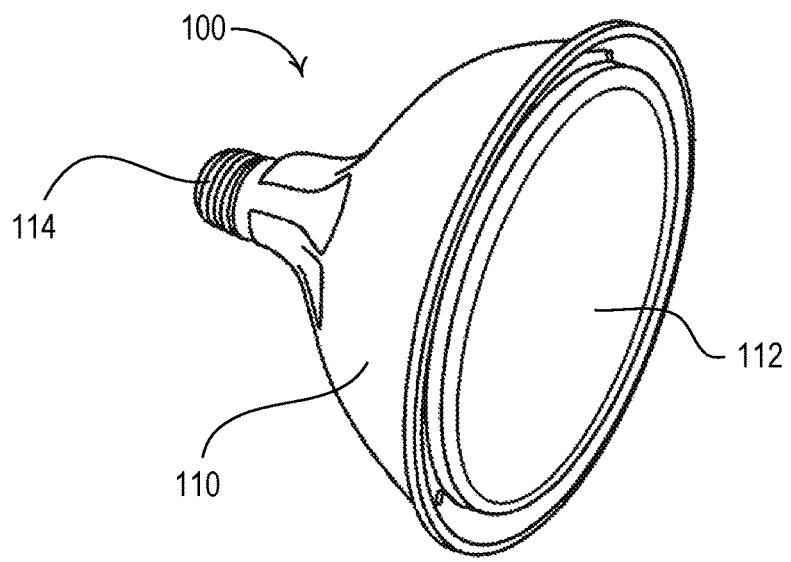
FIG. 1 is a simplified perspective view of an example light source.

FIG. 1 is a simplified perspective view of an example illumination device, such as a lighting device 100 (e.g., an LED light source). The lighting device 100 may have a parabolic form factor and may be a parabolic aluminized reflector (PAR) lamp. The lighting device 100 may include a housing 110 and a lens 112 (e.g., an exit lens), through which light from an internal lighting load (not shown) may shine. The lighting device 100 may include a screw-in base 114 that may be configured to be screwed into a standard Edison socket for electrically coupling the lamp 100 to an alternating-current (AC) power source.

Figure 2:
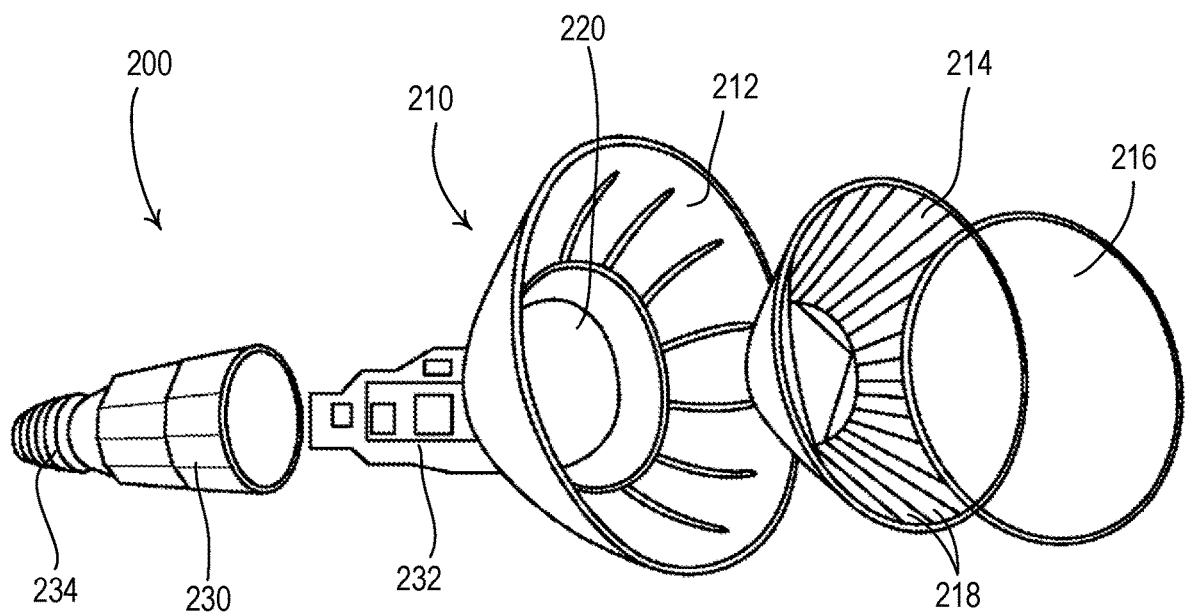
FIG. 2 is an exploded view of another example light source.

FIG. 2 is an exploded view of another example light sour lighting device 200 (e.g., a LED light source) having a parabolic form factor (e.g., which may have a similar assembly as the light source 100 shown in FIG. 1). The lighting device 200 may comprise an emitter housing 210 that includes a heat sink 212 and a reflector 214 (e.g., a parabolic reflector), and a lens 216 (e.g., an exit lens). The lighting device 200 may comprise a lighting load, such an emitter module 220, that may include one or more emission light-emitting diodes (LEDs). The emitter module 220 may be enclosed by the emitter housing 210 and may be configured to shine light through the lens 216. The lens 216 may be made of any suitable material, for example glass. The lens 216 may be transparent or translucent, and may be flat or domed, for example. The reflector 214 may shape the light produced by the emission LEDs within the emitter module 220 into an output beam. The reflector 216 may comprise planar facets 218 (e.g., lunes) that may provide some randomization of the reflections of the light rays emitted by the emitter module 220 prior to exiting light source 220 through the lens 216. The lens 216 may comprises an array of lenslets (not shown) formed on both sides of the lens. An example of a light source having a lens with lenslets is described in greater detail in U.S. Pat. No. 9,736,895, issued Aug. 15, 2017, entitled COLOR MIXING OPTICS FOR LED ILLUMINATION DEVICE, the entire disclosure of which is hereby incorporated by reference.

The lighting device 200 may comprise a driver housing 230 that may be configured to house a driver printed circuit board (PCB) 232 on which the electrical circuitry of the light source may be mounted. The lighting device 200 may include a screw-in base 234 that may be configured to be screwed into a standard Edison socket for electrically coupling the light source to an alternating-current (AC) power source. The screw-in base 234 may be attached to the driver housing 230 and may be electrically coupled to the electrical circuitry mounted to the driver PCB 232. The driver PCB 232 may be electrically connected to the emitter module 220, and may comprise one or more drive circuit and/or one or more control circuits for controlling the amount of power delivered to the emitter LEDs of the emitter module 220.

The driver PCB 232 and the emitter module 220 may be thermally connected to the heat sink 212.

Figure 3:
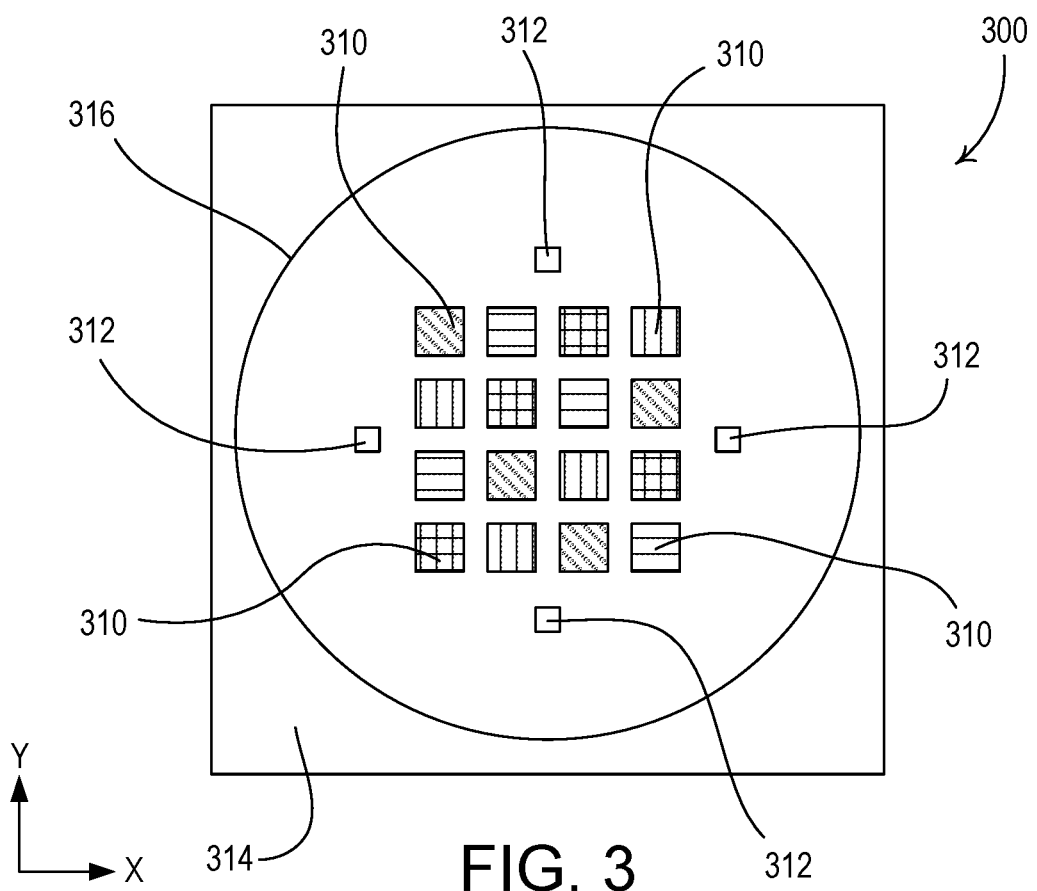
FIG. 3 is a top view of an example emitter module.

FIG. 3 is a top view of an example emitter module 300 (e.g., the emitter module 220 of the light source 200). The emitter module 300 may comprise an array of emitters 310 (e.g., emission LEDs) and detectors 312 (e.g., detection LEDs) mounted on a substrate 314 and encapsulated by a primary optics structure, such as a dome 316. For example, the emitter module 300 may comprise an array of sixteen emitters 310 and four detectors 312. The emitters 310, the detectors 312, the substrate 314, and the dome 316 may form an optical system. The emitters 310 may be arranged in a square array as close as possible together in the center of the dome 316, so as to approximate a centrally located point source. The emitter module 300 may include multiple "chains" of emitters 310 (e.g., series-coupled emitters). The emitters 310 of each chain may be coupled in series and may conduct the same drive current. Each chain may include emitters 310 that produce illumination at a different peak emission wavelength (e.g., emit light of the same color). The emitters 310 of different chains may emit light of different colors. For example, the emitter module 300 may comprise four differently-colored chains of emitters 310 (e.g., red, green, blue, and white or yellow). The array of emitters 310 may include a chain of four red emitters, a chain of four green emitters, a chain of four blue emitters, and a chain of four white or yellow emitters. The individual emitters 310 in each chain may be scattered about the array, and arranged so that no color appears twice in any row, column, or diagonal, to improve color mixing within the emitter module 300.

The detectors 312 may be placed close to each edge of the array of emitters 310 and/or and in the middle of the array of emitters 310 and may be connected in parallel to a receiver of a lighting device in which the emitter module 300 is installed. Similar to the emitters 310, the detectors 312 are LEDs that can be used to emit or receive optical or electrical signals. When the detectors 312 are coupled to receive optical signals and emit electrical signals, the detectors 312 may produce current indicative of incident light from, for example, an emitter, a plurality of emitters, or a chain of emitters. The detectors 312 may be any device that produces current indicative of incident light, such as a silicon photodiode or an LED. For example, the detectors 312 may each be an LED having a peak emission wavelength in the range of approximately 550 nm to 700 nm, such that the detectors 312 may not produce photocurrent in response to infrared light (e.g., to reduce interference from ambient light).

The substrate 314 of the emitter module 310 may be a ceramic substrate formed from an aluminum nitride or an aluminum oxide material or some other reflective material, and may function to improve output efficiency of the emitter module 300 by reflecting light out of the emitter module through the dome 316. The dome 316 may comprise an optically transmissive material, such as silicon or the like, and may be formed through an over-molding process, for example. A surface of the dome 316 may be lightly textured to increase light scattering and promote color mixing, as well as to reflect a small amount of the emitted light back toward the detectors 312 mounted on the substrate 314 (e.g., about 5%). The size of the dome 316 (e.g., a diameter of the dome in a plane of the emitters 310) may be generally dependent on the size of the array of emitters 310. The diameter of the dome may be substantially larger (e.g., about 1.5 to 4 times larger) than the diameter of the array of emitters 310 to prevent occurrences of total internal reflection.

Another form factor of a light source may be a linear form factor. A linear light source may include a number of the emitter modules (e.g., such as the emitter module 220, 300) spaced apart and arranged in a linear manner (e.g., in a line). Each emitter module in the linear light source may include a plurality of emitters and at least one dedicated detector, all of which may mounted onto a common substrate and encapsulated within a primary optics structure. The primary optics structure may be formed from a variety of different materials and may have substantially any shape and/or dimensions necessary to mix the light emitted by the emitters in any desirable manner.

Figure 4:
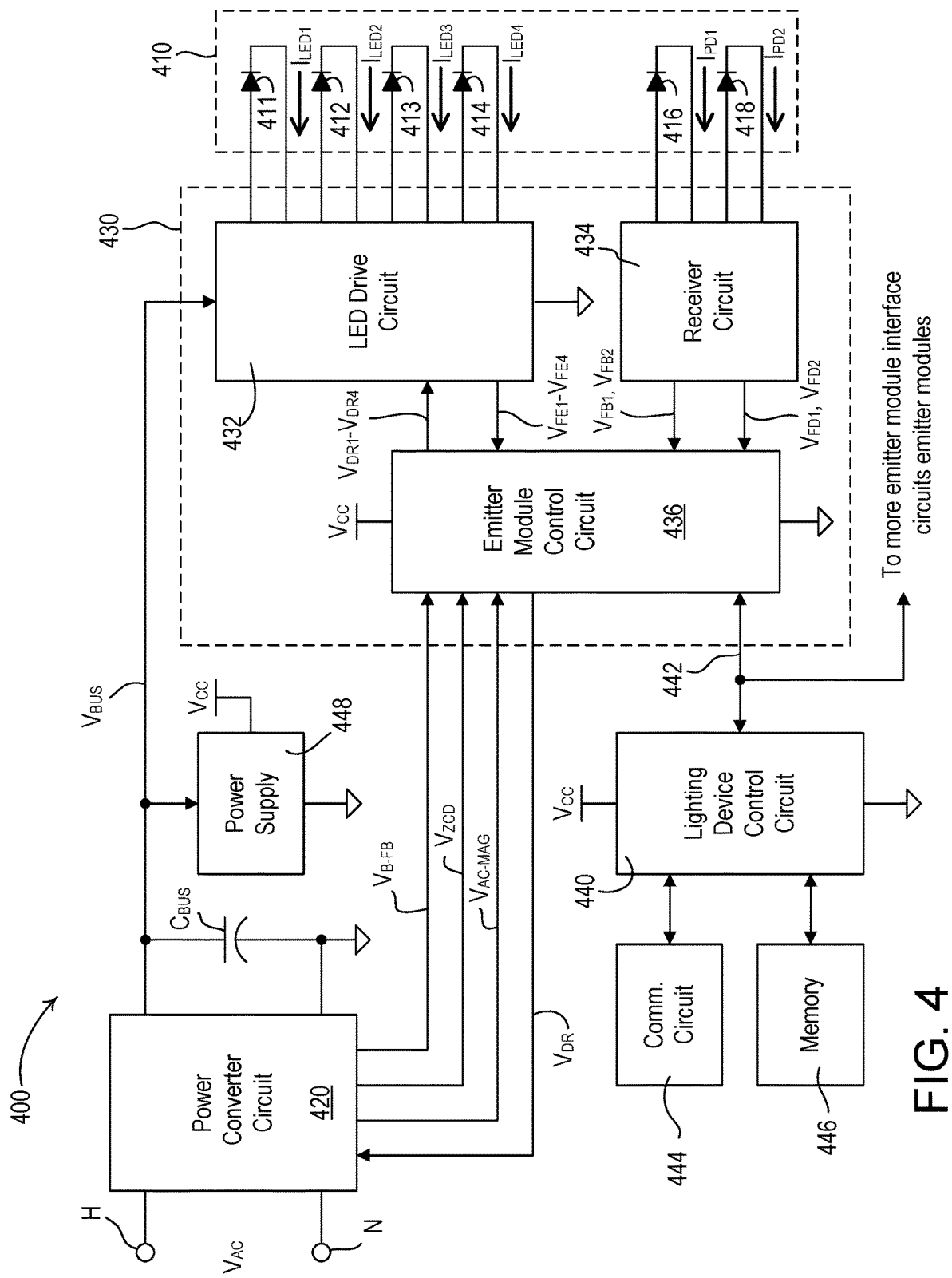
FIG. 4 is a simplified block diagram of an example lighting device.

FIG. 4 is a simplified block diagram of an example electrical device, such as a lighting device 400 (e.g., the light source 100 shown in FIG. 1 and/or the light source 200 shown in FIG. 2). The lighting device 400 may comprise one or more emitter modules 410 (e.g., the emitter module 300 shown in FIG. 3). For example, if the lighting device 400 is a PAR lamp (e.g., as shown in FIGS. 1 and 2), the lighting device comprise a single emitter module 410. The emitter module 410 may comprise one or more emitters 411, 412, 413, 414. Each emitter 411-414 is shown in FIG. 4 as a single LED, but may each comprise a plurality of LEDs connected in series (e.g., a chain of LEDs), a plurality of LEDs connected in parallel, or a suitable combination thereof, depending on the particular lighting system. In addition, each emitter 411-414 may comprise one or more organic light-emitting diodes (OLEDs). For example, the first emitter 411 may represent a chain of red LEDs, the second emitter 412 may represent a chain of blue LEDs, the third emitter 413 may represent a chain of green LEDs, and the fourth emitter 414 may represent a chain of white or amber LEDs. The emitters 411-414 may be controlled to adjust a brightness (e.g., a luminous flux or an intensity) and/or a color (e.g., a color temperature) of a cumulative light output of the lighting device 400. The emitter module 410 may also comprise one or more detectors 416, 418 (e.g., photodiodes, such as a red LED and a green LED) that may produce respective photodiode currents $I_{PD1}$, $I_{PD2}$ (e.g., detector signals) in response to incident light.

The lighting device 400 may comprise a power converter circuit 420, which may receive a source voltage, such as an AC mains line voltage $V_{AC}$, via a hot connection H and a neutral connection N, and generate a DC bus voltage $V_{BUS}$ (e.g., approximately 15-20V) across a bus capacitor $C_{BUS}$. The power converter circuit 420 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 420 may provide electrical isolation between the AC power source and the emitters 411-414, and may operate as a power factor correction (PFC) circuit to adjust the power factor of the lighting device 400 towards a power factor of one. Further, although the DC bus voltage $V_{BUS}$ is illustrated as being connected to just a single emitter module interface circuit 430, in instances where the lighting device 400 includes more than one emitter module interface circuit 430, the DC bus voltage $V_{BUS}$ may be provided to each emitter module interface circuit 430.

The lighting device 400 may comprise one or more emitter module interface circuits 430 (e.g., one emitter module interface circuit per emitter module 410 in the lighting device 400). The emitter module interface circuit 430 may comprise a load regulation circuit, such as an LED drive circuit 432, for controlling (e.g., individually controlling) the power delivered to and the luminous flux of the light emitted of each of the emitters 411-414 of the respective emitter module 410. The LED drive circuit 432 may receive the bus voltage $V_{BUS}$ and may adjust magnitudes of respective LED drive currents $I_{LED1}$, $I_{LED2}$, $I_{LED3}$, $I_{LED4}$ conducted through the LED light sources 411-414. The LED drive circuit 432 may comprise one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 432 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The emitter module interface circuit 430 may also comprise a receiver circuit 334 that may be electrically coupled to the detectors 416, 418 of the emitter module 310 for generating respective optical feedback signals $V_{FB1}$, $V_{FB2}$ in response to the photodiode currents $I_{PD1}$, $I_{PD2}$. The receiver circuit 434 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The emitter module interface circuit 430 may also comprise an emitter module control circuit 436 for controlling the LED drive circuit 432 to control the intensities of the emitters 411-414 of the emitter module 410. The emitter module control circuit 436 may comprise, for example, a microprocessor, a microcontroller, a programmable logic device (PLD), an application specific integrated circuit (ASIC), a field-programmable gate array (FPGA), or any other suitable processing device or controller. The emitter module control circuit 436 may generate one or more drive signals $V_{DR1}$, $V_{DR2}$, $V_{DR3}$, $V_{DR4}$ for controlling the respective regulation circuits in the LED drive circuit 432. The emitter module control circuit 436 may receive the optical feedback signals $V_{FB1}$, $V_{FB2}$ from the receiver circuit 434 for determining the luminous flux $L_E$ of the light emitted by the emitters 411-414.

The emitter module control circuit 436 may also receive a plurality of emitter forward-voltage feedback signals $V_{FE1}$, $V_{FE2}$, $V_{FE3}$, $V_{FE4}$ from the LED drive circuit 432 and a plurality of detector forward-voltage feedback signals $V_{FD1}$, $V_{FD2}$ from the receiver circuit 434. The emitter forward-voltage feedback signals $V_{FE1}$-$V_{FE4}$ may be representative of the magnitudes of the forward voltages of the respective emitters 411-414, which may indicate temperatures $T_{E1}$, $T_{E2}$, $T_{E3}$, $T_{E4}$ of the respective emitters. If each emitter 411-414 comprises multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 416-418, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 416, 418.

The emitter module control circuit 436 may be configured to control the operation of the power converter circuit 420. For example, the emitter module control circuit 436 may be configured to generate a drive signal $V_{DR}$ for controlling the power converter circuit 420 in response to a zero cross detect signal $V_{ZCD}$ received form the power converter circuit 420. The emitter module control circuit 436 may also receive an AC-magnitude signal $V_{AC-MAG}$ that indicates an instantaneous magnitude of the AC line voltage $V_{AC}$ and a bus voltage feedback signal $V_{B-FB}$ that indicates the present magnitude of the bus voltage $V_{BUS}$. When the lighting device 400 is turned off (e.g., all of the emitters 411, 412, 413, 414 are off), the power converter circuit 420 may be configured to operate in a standby mode. The emitter module control circuit 436 may be configured to enable and disable the operation of the power converter circuit 420 in response to the magnitude of the bus voltage $V_{BUS}$ to reduce the power consumption of the power converter circuit 420 in the standby mode. In addition, the emitter module control circuit 436 may be configured to control the power converter circuit 420 in response to the instantaneous magnitude of the AC line voltage $V_{AC}$, such that the magnitude of an input current $I_{IN}$ of the power converter circuit 420 is sinusoidal, for example, when operating in normal mode (e.g., as will be described in greater detail below). Further, in examples where the lighting device 400 includes multiple emitter module interface circuits 430 and where the emitter module control circuit 436 is configured to control the operation of the power converter circuit 420, the emitter module control circuit 436 of one of the emitter module interface circuits 430 may control the operation of the power converter circuit 420, and/or all of the emitter module interface circuits 430 may share the same emitter module control circuit 436, which may control the operation of the power converter circuit 420.

The lighting device 400 may comprise a lighting device control circuit 440 that may be electrically coupled to the emitter module control circuit 436 of each of the one or more emitter module interface circuits 430 via a communication bus 442 (e.g., an I²C communication bus). The lighting device control circuit 440 may be configured to control the emitter modules 430 to control the brightness (e.g., the luminous flux) and/or the color (e.g., the color temperature) of the cumulative light emitted by the lighting device 400. The lighting device control circuit 440 may comprise, for example, a microprocessor, a microcontroller, a programmable logic device (PLD), an application specific integrated circuit (ASIC), a field-programmable gate array (FPGA), or any other suitable processing device or controller. The lighting device control circuit 440 may be configured to adjust (e.g., dim) a present intensity $L_{PRES}$ (e.g., a present brightness) of the cumulative light emitted by the lighting device 400 towards a target intensity $L_{TRGT}$ (e.g., a target brightness), which may range across a dimming range of the light source, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The lighting device control circuit 440 may be configured to adjust a present color temperature $T_{PRES}$ of the cumulative light emitted by the lighting device 400 towards a target color temperature $T_{TRGT}$, which may range between a cool-white color temperature (e.g., approximately 3100-4500 K) and a warm-white color temperature (e.g., approximately 2000-3000 K).

The lighting device 400 may comprise a communication circuit 434 coupled to the lighting device control circuit 440. The communication circuit 434 may comprise a wireless communication circuit, such as, for example, a radio-frequency (RF) transceiver coupled to an antenna for transmitting and/or receiving RF signals. The wireless communication circuit may be an RF transmitter for transmitting RF signals, an RF receiver for receiving RF signals, or an infrared (IR) transmitter and/or receiver for transmitting and/or receiving IR signals. The communication circuit 434 may be coupled to the hot connection H and the neutral connection N of the lighting device 400 for transmitting a control signal via the electrical wiring using, for example, a power-line carrier (PLC) communication technique. The lighting device control circuit 440 may be configured to determine the target intensity $L_{TRGT}$ for the lighting device 400 in response to messages (e.g., digital messages) received via the communication circuit 434.

The lighting device 400 may comprise a memory 446 configured to store operational characteristics of the lighting device 400 (e.g., the target intensity $L_{TRGT}$, the target color temperature $T_{TRGT}$, the low-end intensity $L_{LE}$, the high-end intensity $L_{HE}$, etc.). The memory may be implemented as an external integrated circuit (IC) or as an internal circuit of the lighting device control circuit 440. The lighting device 400 may comprise a power supply 448 that may receive the bus voltage $V_{BUS}$ and generate a supply voltage $V_{CC}$ for powering the lighting device control circuit 440 and other low-voltage circuitry of the lighting device, such as the lighting device control circuit 440, the communication circuit 444, and/or the memory 446.

When the lighting device 400 is on, the lighting device control circuit 440 may be configured to control the emitter modules 410 to emit light substantially all of the time. The lighting device control circuit 440 may be configured to control the emitter modules 410 to disrupt the normal emission of light to measure one or more operational characteristics of the emitter modules during periodic measurement intervals. For example, during the measurement intervals, the emitter module control circuit 436 may be configured to individually turn on each of the different-colored emitters 411-414 of the emitter modules 410 (e.g., while turning of the other emitters) and measure the luminous flux of the light emitted by that emitter using one of the two detectors 416, 418. For example, the emitter module control circuit 436 may turn on the first emitter 411 of the emitter module 410 (e.g., at the same time as turning off the other emitters 412-414) and determine the luminous flux $L_E$ of the light emitted by the first emitter 411 in response to the first optical feedback signal $V_{FB1}$ generated from the first detector 416. In addition, the emitter module control circuit 436 may be configured to drive the emitters 411-414 and the detectors 416, 418 to generate the emitter forward-voltage feedback signals $V_{FE1}$-$V_{FE4}$ and the detector forward-voltage feedback signals $V_{FD1}$, $V_{FD2}$ during the measurement intervals.

Methods of measuring the operational characteristics of emitter modules in a light source are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392,663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the lighting device 400 may be stored in the memory 446 as part of a calibration procedure performed during manufacturing of the lighting device 400. Calibration values may be stored for each of the emitters 411-414 and/or the detectors 416, 418 of each of the emitter modules 410. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and y-chromaticity measurements may be obtained from the emitters 411-414 using an external calibration tool, such as a spectrophotometer. The values for the emitter forward voltages, photodiode currents, and detector forward voltages may be measured internally to the lighting device 400. The calibration values for each of the emitters 411-414 and/or the detectors 416, 418 may be measured at a plurality of different drive currents, e.g., at 100%, 30%, and 10% of a maximum drive current for each respective emitter.

In addition, the calibration values for each of the emitters 411-414 and/or the detectors 416, 418 may be measured at a plurality of different operating temperatures. The lighting device 400 may be operated in an environment that is controlled to multiple calibration temperatures and values of the operational characteristics may be measured and stored. For example, the lighting device 400 may be operated at a cold calibration temperature, such as room temperature (e.g., approximately 25° C.), and a hot calibration temperature (e.g., approximately 85° C.). At each temperature, the calibration values for each of the emitters 411-414 and/or the detectors 416, 418 may be measured at each of the plurality of drive currents and stored in the memory 446.

After installation, the lighting device control circuit 440 of the lighting device 400 may use the calibration values stored in the memory 446 to maintain a constant light output from the emitter modules 410. The lighting device control circuit 440 may determine target values for the luminous flux to be emitted from the emitters 411-414 to achieve the target intensity $L_{TRGT}$ and/or the target color temperature $T_{TRGT}$ for the lighting device 400. The lighting device control circuit 440 may determine the magnitudes for the respective drive currents $I_{LED1}$-$I_{LED4}$ for the emitters 411-414 based on the determined target values for the luminous flux to be emitted from the emitters 411-414. When the age of the lighting device 400 is zero, the magnitudes of the respective drive currents $I_{LED1}$-$I_{LED4}$ for the emitters 411-414 may be controlled to initial magnitudes LED-INITIAL.

The light output of the emitter modules 410 may decrease as the emitters 411-414 age. The light source control circuit 340 may be configured to increase the magnitudes of the drive current $I_{DR}$ for the emitters 411-414 to adjusted magnitudes $I_{LED-ADJUSTED}$ to achieve the determined target values for the luminous flux of the target intensity $L_{TRGT}$ and/or the target color temperature $T_{TRGT}$. Methods of adjusting the drive currents of emitters to achieve a constant light output as the emitters age are described in greater detail in U.S. Patent Application Publication No. 2015/0382422, published Dec. 31, 2015, entitled ILLUMINATION DEVICE AND AGE COMPENSATION METHOD, the entire disclosure of which is hereby incorporated by reference.

Figure 5:
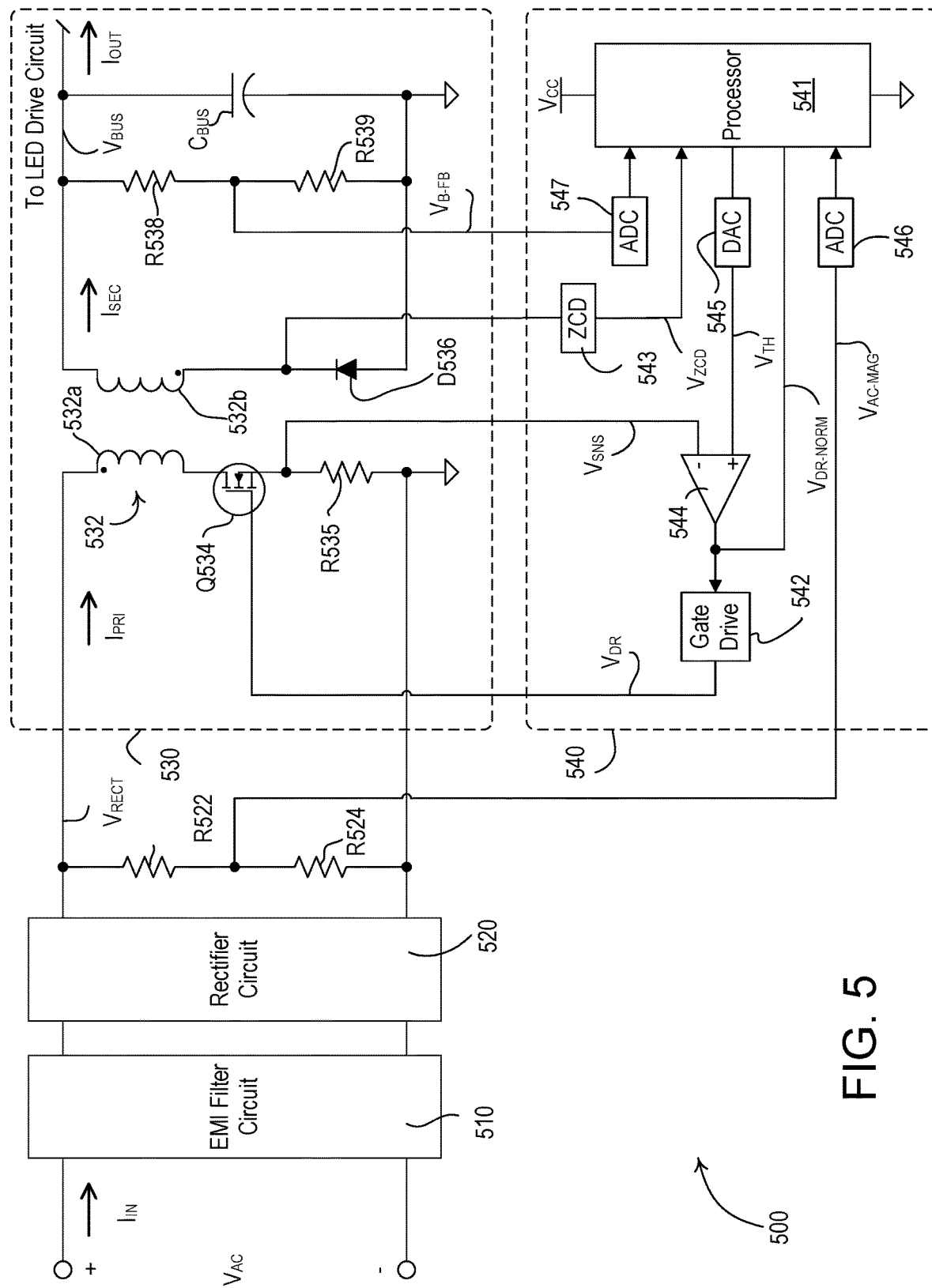
FIG. 5 is simplified schematic diagram of a power converter circuit of a load control device.

FIG. 5 is simplified schematic diagram of a power converter circuit 500 of a load control device (e.g., the power converter circuit 420 of the lighting device 400 shown in FIG. 4). The power converter circuit 500 may be configured to receive an alternating-current (AC) line voltage $V_{AC}$ from an AC power source (not shown) via a hot terminal H and a neutral terminal N. The power converter circuit 500 may comprise an electromagnetic interference (EMI) filter circuit 510 that may comprise one or more inductors and capacitors configured to minimize the noise provided back to the AC power source from the power converter circuit 500 and/or the load control device. The EMI filter circuit 510 may conduct an input current $I_{IN}$ from the AC power source (e.g., through one or more of the inductors of the EMI filter circuit).

The power converter circuit 500 may also comprise a rectifier circuit 520 (e.g., a half-wave rectifier circuit or a full-wave rectifier circuit, such as a diode bridge) for generating a rectified voltage $V_{RECT}$ from the AC line voltage $V_{AC}$. The power converter circuit 500 may also comprise a resistive divider circuit having resistors R522, R524. The resistive divider circuit may be coupled across the output (e.g., DC terminals) of the rectifier circuit 520 and may be configured to generate an AC-magnitude signal $V_{AC-MAG}$, which may be a scaled version of the rectified voltage $V_{RECT}$ and may indicate the instantaneous magnitude of the AC line voltage $V_{AC}$. Additionally or alternatively, the resistive divider circuit may be coupled across the input of the EMI filter circuit 510 (e.g., between the hot terminal H and the neutral terminal N).

The power converter circuit 500 may also comprise a flyback converter circuit 530 configured to generate a bus voltage $V_{BUS}$ across a bus capacitor $C_{BUS}$. The flyback converter circuit 530 may comprise a flyback transformer 532 that has a primary winding 532a and a secondary winding 532b. The flyback converter circuit 530 may also comprise a semiconductor switch, such as a field-effect transistor (FET) Q534, coupled in series with the primary winding 532a of the flyback transformer 532 and a sense resistor R535. When the FET Q534 is conductive, the primary winding 532a of the flyback transformer 532 may conduct a primary current $I_{PRI}$ through the sense resistor R535 to generate a sense voltage $V_{SNS}$ across the sense resistor R535. The magnitude of the sense voltage $V_{SNS}$ may indicate the magnitude of the primary current $I_{PRI}$. The secondary winding 532b of the flyback transformer 532 may be coupled in series with a diode D536 and the bus capacitor $C_{BUS}$. The flyback converter circuit 530 may also comprise a resistive divider circuit having resistors R538, R539. The resistive divider circuit may be coupled across the bus capacitor $C_{BUS}$ and maybe configured to generate a bus voltage feedback signal $V_{B-FB}$ that may indicate the magnitude of the bus voltage $V_{BUS}$.

The power converter circuit 500 may comprise a flyback control circuit 540 configured to generate a drive signal $V_{DR}$ for rendering the FET Q534 of the flyback converter circuit 530 conductive and non-conductive. Although illustrated as a component of the power converter circuit 500, in some examples an emitter module interface circuit (e.g., the emitter module interface circuit 430) may include the flyback control circuit 540, such that, for example, the flyback control circuit 540 may act as an emitter module control circuit (e.g., the emitter module control circuit 436). Alternatively, in some examples, the flyback control circuit 540 may act as a control circuit for any combination of components of the lighting device (e.g., the flyback control circuit 540 may perform one or more functions performed by the lighting device control circuit 440).

During a normal mode of operation, a processor 541 of the flyback control circuit 540 may generate a normal-mode drive signal $V_{DR-NORM}$ that may be coupled to the gate of the FET Q534 via a gate drive circuit 542. The processor 541 may be configured to control the normal-mode drive signal $V_{DR-NORM}$ to generate the drive signal $V_{DR}$ for rendering the FET Q534 conductive and non-conductive. The drive signal $V_{DR}$ may be characterized by an operating period $T_{OP}$ and an operating frequency $f_{OP}$. The operating period $T_{OP}$ may be limited to a minimum operating period $T_{MIN}$ (e.g., may not be controlled to be smaller than the minimum operating period $T_{MIN}$ by the processor 541) thus setting a maximum operating frequency $f_{MAX}$ for the flyback converter circuit 530. The minimum operating period $T_{MIN}$ may be based on the technical specifications of the hardware components of the flyback converter circuit 530. When the FET Q534 is rendered conductive, the primary winding 532a of the flyback transformer 532 may conduct the primary current $I_{PRI}$ to store energy in the flyback transformer 532. When the FET Q534 is rendered non-conductive, the secondary winding 532b may conduct a secondary current $I_{SEC}$ to charge the bus capacitor $C_{BUS}$.

The processor 541 may control the normal-mode drive signal $V_{DR-NORM}$ to operate the flyback converter circuit 530 using a power factor correction (PFC) technique in order to adjust the power factor of the power converter circuit 500 and/or the load control device towards a power factor of one. In addition, the processor 541 may control the flyback converter circuit 530 to optimize the efficiency of the power converter circuit 500, the total harmonic distortion (THD) of the input current $I_{IN}$, and/or the electromagnetic interference (EMI) provided to the AC power source. For example, when operating at a steady state condition, the processor 541 may render the FET Q534 conductive using a constant on time (e.g., the same from one cycle of the flyback converter circuit 530 to the next). The processor 541 may be configured to adjust the constant on time used to control the FET Q534 in response to a present output power $P_{OUT}$ of the power converter circuit 500. That is, when operating at a steady state condition, the processor 541 may be configured to maintain the on time constant but adjust the operating period $T_{OP}$ based on the present output power $P_{OUT}$ of the power converter circuit 500. For example, the processor 541 may be configured to determine the present output power $P_{OUT}$ in response to the present magnitude of the bus voltage $V_{BUS}$ and the present magnitude of an output current $I_{OUT}$ of the power converter circuit (e.g., $P_{OUT}=V_{BUS} \cdot I_{OUT}$). The processor 541 may be configured to determine the magnitude of the output current $I_{OUT}$ based on the present magnitudes of the drive currents (e.g., the magnitudes of LED drive currents $I_{LED1}$, $I_{LED2}$, $I_{LED3}$, $I_{LED4}$).

When the output power $P_{OUT}$ is high, the flyback converter circuit 530 may operate in a critical conduction mode. For example, the flyback converter circuit 520 may operate in the critical conduction mode when the operating period $T_{OP}$ of the drive cycle remains above the minimum operating period $T_{MIN}$ for the entirety of each half-cycle of the AC line voltage $V_{AC}$. The flyback control circuit 540 may comprise a zero cross detect circuit 543, that may generate a zero cross detect signal $V_{ZCD}$ in response to a voltage developed across the diode D536. The zero cross detect signal $V_{ZCD}$ may indicate when the magnitude of the secondary current $I_{SEC}$ drops to approximately zero amps. For example, when the magnitude of the magnitude of the secondary current $I_{SEC}$ drops to approximately zero amps, the diode D536 may stop conducting, and the voltage developed from the cathode to the anode of the diode D536 may increase causing the zero-cross detect circuit 543 to indicate that the magnitude of the secondary current $I_{SEC}$ has dropped to zero amps. When operating in the critical conduction mode, the processor 541 may render the FET 534 conductive when the magnitude of the secondary current $I_{SEC}$ drops to zero amps (e.g., in response to the zero cross detect signal $V_{ZCD}$). In a steady state condition, the operating frequency $f_{OP}$ of the flyback converter circuit 530 may vary through a half-cycle of the AC line voltage $V_{AC}$ in order to make the power converter circuit 500 look resistive to the AC power source to improve the power factor of the power converter circuit 500 and/or the load control device. The operating frequency $f_{OP}$ of the flyback converter circuit 530 may decrease as the instantaneous magnitude of the AC line voltage $V_{AC}$ increases during a first half of the half-cycle towards a peak magnitude and then increase during a second half of the half-cycle. As such, when output power $P_{OUT}$ is high, the operating frequency $f_{OP}$ of the flyback converter circuit 530 may resemble an inverted bell curve for each half-cycle of the AC line voltage $V_{AC}$.

As the output power $P_{OUT}$ of the power converter circuit 500 decreases, the operating period $T_{OP}$ of the flyback converter circuit 530 may decrease. When the output power $P_{OUT}$ decreases to a point where the operating period $T_{OP}$ is limited to the minimum operating period $T_{MIN}$ for at least a portion of each half-cycle, the flyback converter circuit 530 may begin operating in discontinuous conduction mode. Eventually, the output power $P_{OUT}$ may decrease to a point where the operating period $T_{OP}$ may be held constant at the minimum operating period $T_{MIN}$, and in turn, the operating frequency $f_{OP}$ may be held constant at the maximum operating frequency $f_{MAX}$ (e.g., for at least a portion of each half-cycle of the AC line voltage $V_{AC}$). Operation at a constant frequency may increase the electromagnetic interference (EMI) generated by the power converter circuit 500. So, although the operating frequency $f_{OP}$ is spread out when the output power $P_{OUT}$ is high (e.g., and when operating in the critical conduction mode), eventually the output power $P_{OUT}$ may decrease to a point where the operating frequency $f_{OP}$ is limited by a maximum operating frequency $f_{MAX}$ for extended portions of each half-cycle of the AC line voltage $V_{AC}$, and this concentrated operation at the maximum operating frequency $f_{MAX}$ may increase electromagnetic interference generated by the power converter circuit 500 at the maximum operating frequency $f_{MAX}$, which is undesirable.

Figure 6A:
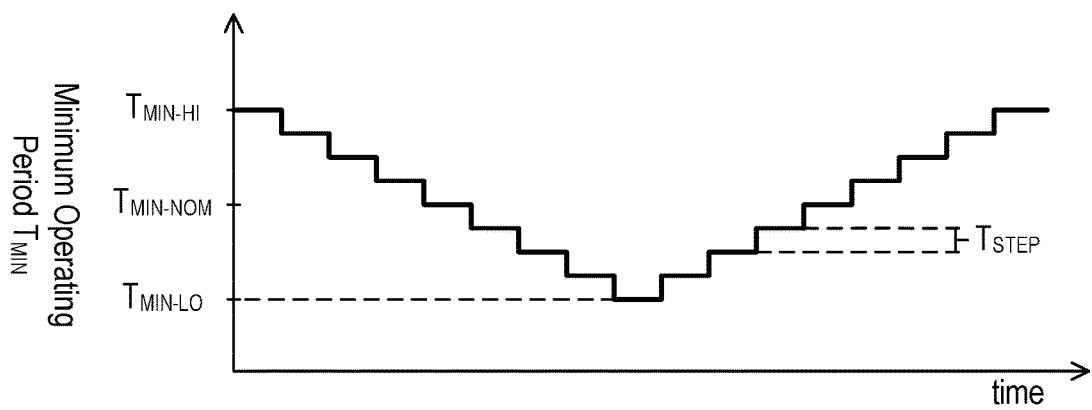
FIG. 6A is an example plot of a minimum operating period of the power converter circuit of FIG. 5 with respect to time.

As such, the processor 541 may be configured to adjust (e.g., dither) a value of the minimum operating period $T_{MIN}$ over a range of values with respect to time, such that the flyback converter circuit 530 does not operate at a constant operating frequency $f_{OP}$ even when the operating period $T_{OP}$ is being limited to the minimum operating period $T_{MIN}$. FIG. 6A is an example plot of a value of the minimum operating period $T_{MIN}$ of the flyback converter circuit 530 with respect to time. The processor 541 may determine to adjust (e.g., dither) the value of the minimum operating period $T_{MIN}$ with respect to time when, for example, the processor 541 detects that the output power $P_{OUT}$ has decreased to the point where the operating period $T_{OP}$ would otherwise be held constant at the minimum operating period $T_{MIN}$ for at least a portion of each-half cycle of the AC line voltage $V_{AC}$. The processor 541 may adjust the value of the minimum operating period $T_{MIN}$ in a range around a nominal minimum operating period $T_{MIN-NOM}$, e.g., between a high value $T_{MIN-HI}$ and a low value $T_{MIN-LO}$. The processor 541 may increase the value of the minimum operating period $T_{MIN}$ by a step value $T_{STEP}$ (e.g., approximately 0.05-0.10 microseconds) when adjusting from the low value $T_{MIN-LO}$ to the high value $T_{MIN-HI}$, and decrease the value of the minimum operating period $T_{MIN}$ by the step value $T_{STEP}$ when adjusting from the high value $T_{MIN-HI}$ and the low value $T_{MIN-LO}$. In some examples, the processor 541 may adjust the value of the minimum operating period $T_{MIN}$ by the step value $T_{STEP}$ every 20 microseconds. By adjusting (e.g., dithering) the minimum operating period $T_{MIN}$ with respect to time, the processor 541 may spread the electromagnetic interference generated by the power converter circuit 500 over various frequencies and eliminate a concentration of electromagnetic interference at the maximum operating frequency $f_{MAX}$.

Figure 6B:
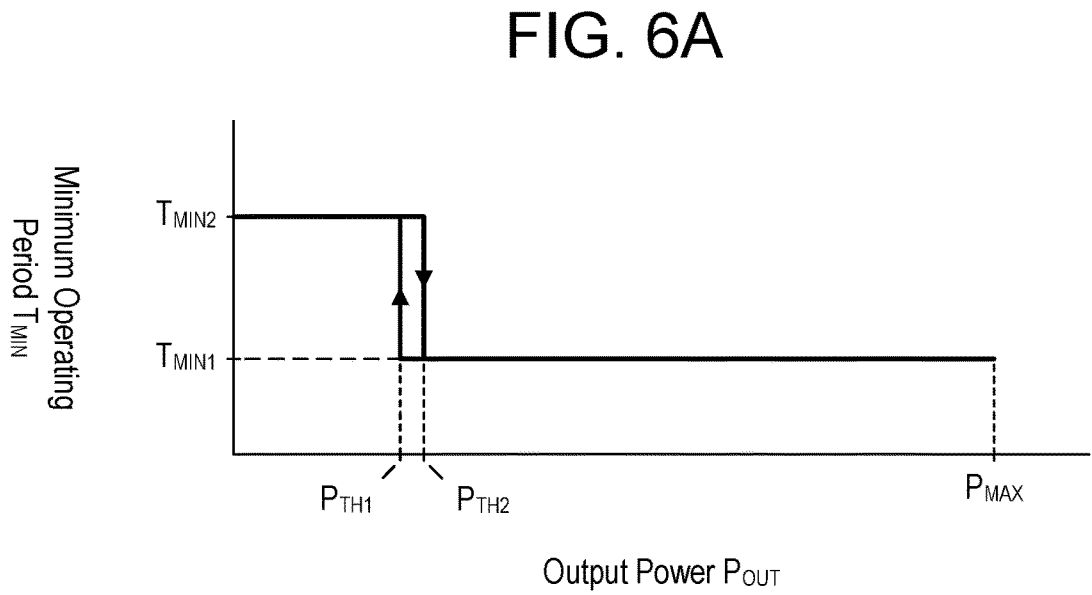
FIG. 6B is an example plot of a minimum operating period with respect to an output power of the power converter circuit of FIG. 5
Figure 6C:
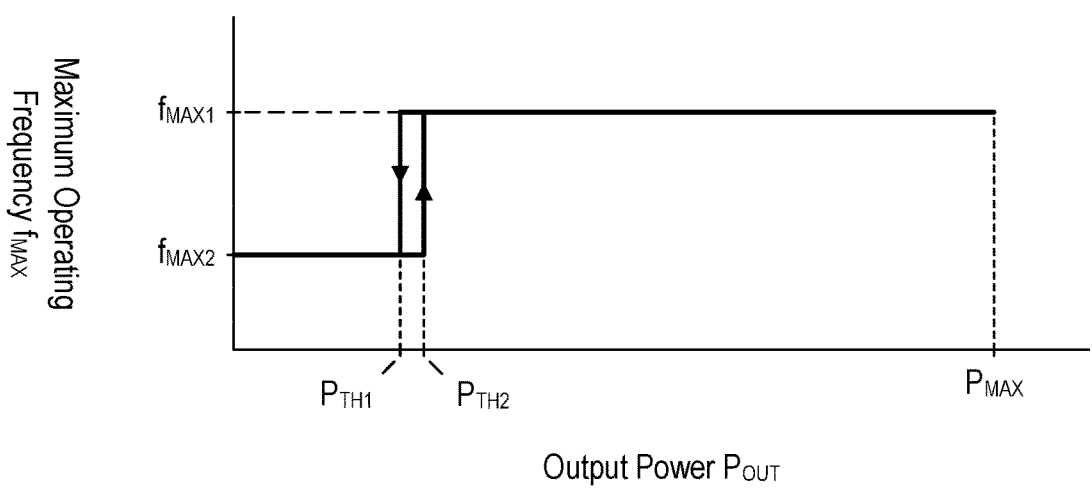
FIG. 6C is an example plot of a maximum operating frequency with respect to an output power of the power converter circuit of FIG. 5.

The processor 541 may also be configured to adjust the value of the minimum operating period $T_{MIN}$ (e.g., the nominal minimum operating period $T_{MIN-NOM}$) in dependence upon the present output power $P_{OUT}$ of the power converter circuit 500. For example, the processor 541 may be configured to decrease the value of the minimum operating period $T_{MIN}$ as the output power $P_{OUT}$ decreases and vice versa. FIG. 6B is an example plot of a value of the minimum operating period $T_{MIN}$ (e.g., the nominal minimum operating period $T_{MIN-NOM}$) with respect to the output power $P_{OUT}$ of the power converter circuit 500. FIG. 6C is an example plot of a value of the maximum operating frequency $f_{MAX}$ with respect to the output power $P_{OUT}$ of the power converter circuit 500. For example, when the output power $P_{OUT}$ of the power converter circuit 530 is high, the processor 541 may set the value of the minimum operating period $T_{MIN}$ (e.g., the nominal minimum operating period $T_{MIN-NOM}$) to a first value $T_{MIN1}$ (e.g., approximately 5 microseconds) to set the value of the maximum operating frequency $f_{MAX}$ to a first value $f_{MAX1}$ (e.g., approximately 200 kHz). The processor 541 may adjust the minimum operating period $T_{MIN}$ using hysteresis. When the output power $P_{OUT}$ falls below a first power threshold $P_{TH1}$ (e.g., approximately 7.5 W), the processor 541 may increase the value of the minimum operating period $T_{MIN}$ to a second value $T_{MIN2}$ (e.g., approximately 10 microseconds) to set the value of the maximum operating frequency $f_{MAX}$ to a second value $f_{MAX2}$ (e.g., approximately 100 kHz). When the output power rises above a second power threshold $P_{TH2}$ (e.g., approximately 8 W), the processor 541 may decrease the value of the minimum operating period $T_{MIN}$ back to the first value $T_{MIN1}$. Further, in some examples, the processor 541 may set the value of the minimum operating period $T_{MIN}$ to the first value $T_{MIN1}$ when the output power $P_{OUT}$ is greater than a power threshold (e.g., approximately 7.5 W), and to the second value $T_{MIN2}$ when the output power $P_{OUT}$ is less than or equal to that power threshold.

The processor 541 may be configured to adjust (e.g., dither) the value of the minimum operating period $T_{MIN}$ around the first value $T_{MIN1}$ or the second value $T_{MIN2}$ (e.g., as described above with reference to FIG. 6A). For example, when the output power $P_{OUT}$ of the power converter circuit 530 is high, the nominal minimum operating period $T_{MIN-NOM}$ may be set to the first value $T_{MIN1}$ and the maximum operating frequency $f_{MAX}$ may equal to the first value $f_{MAX1}$. The processor 541 may adjust (e.g., dither) the value of the minimum operating period $T_{MIN}$ in a range around the nominal minimum operating period $T_{MIN-NOM}$, which is set to the first value $T_{MIN1}$, between a high value $T_{MIN-HI}$ and a low value $T_{MIN-LO}$. Then, when the output power $P_{OUT}$ of the power converter circuit 530 falls below the first power threshold $P_{TH1}$, the processor 541 may increase the nominal minimum operating period $T_{MIN-NOM}$ to the second value $T_{MIN2}$ to set the maximum operating frequency $f_{MAX}$ to the second value $f_{MAX2}$. The processor 541 may then adjust the value of the minimum operating period $T_{MIN}$ in a range around the nominal minimum operating period $T_{MIN-NOM}$, which is set to the second value $T_{MIN2}$, between a high value $T_{MIN-HI}$ and a low value $T_{MIN-LO}$ (e.g., which is different from the high value $T_{MIN-HI}$ and the low value $T_{MIN-LO}$ used when the minimum operating period $T_{MIN}$ was set to the first value $T_{MIN1}$). Accordingly, the processor 541 may adjust the value of the minimum operating period $T_{MIN}$ (e.g., the nominal minimum operating period $T_{MIN-NOM}$) in response to the output power $P_{OUT}$ using hysteresis and adjust (e.g., dither) the value of the minimum operating period $T_{MIN}$ over a range of values with respect to time, which for example, may further spread out the maximum operating frequency $f_{MAX}$ of the power converter circuit 500 and eliminate a concentration of electromagnetic interference at one particular frequency.

The power converter circuit 500 may be configured to operate in a standby mode when the electrical load being controlled by the load control device is turned off. The processor 541 may be configured to disable some portions of the flyback converter circuit 530 and/or the flyback control circuit 540, such that the power converter circuit 500 draws less power from AC power source when in the standby mode. The flyback control circuit 540 may comprise a comparator 544 for generating the drive signal $V_{DR}$ during the standby mode. The comparator 542 may receive the sense voltage $V_{SNS}$ from the flyback converter circuit 530 at a negative input and a threshold voltage $V_{TH}$ (e.g., DC voltage) at a positive input. An output of the comparator 542 may be coupled to the gate of the FET Q534 via the gate drive circuit 542. When the magnitude of the sense voltage $V_{SNS}$ is less than the threshold voltage $V_{TH}$, the comparator 544 may drive the output high to cause the gate drive circuit 542 to render the FET Q534 conductive. When the magnitude of the primary current $I_{PRI}$ increases to a point when the sense voltage $V_{SNS}$ exceeds the threshold voltage $V_{TH}$, the comparator 544 may drive the output low to cause the gate drive circuit 542 to render the FET Q524 non-conductive. The processor 541 may use a digital-to-analog converter (DAC) 545 to generate the threshold voltage $V_{TH}$. The processor 541 may receive the AC-magnitude signal $V_{AC-MAG}$ via a first analog-to-digital converter (ADC) 546 and the bus voltage feedback signal $V_{B-FB}$ from the flyback converter circuit 530 via a second analog-to-digital converter (ADC) 547.

Figure 7:
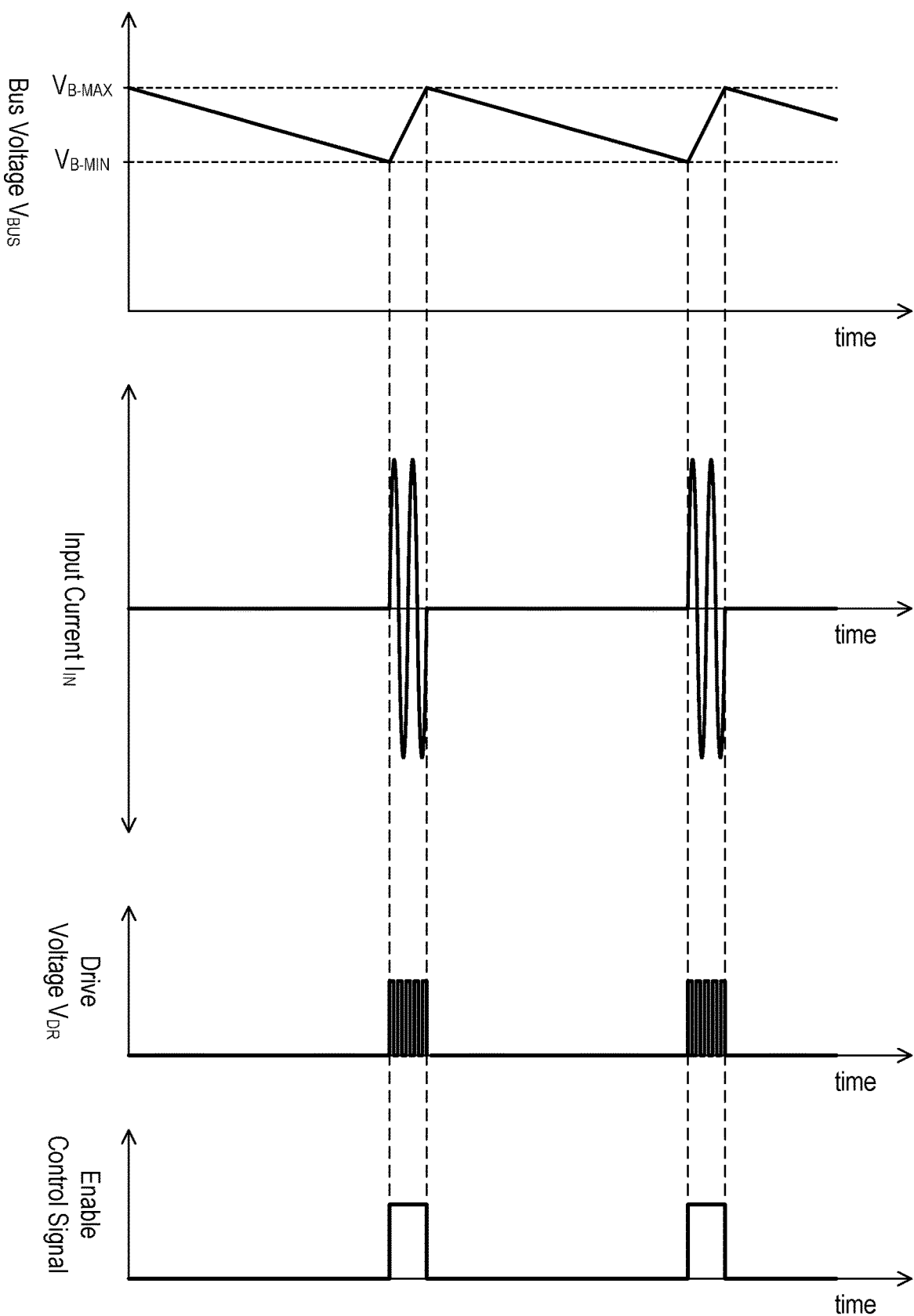
FIGS. 7, 8, and 9 show example waveforms illustrating the operation of the power converter circuit of FIG. 5 in a standby mode.

FIG. 7 shows example waveforms illustrating the operation of the power converter circuit 500 in the standby mode. When operating in the standby mode, the processor 541 is configured to periodically enable and disable the operation of the flyback converter circuit 530. For example, the processor 541 may generate an enable control signal (e.g., a digital signal) for controlling when the flyback converter circuit 530 is enabled (e.g., actively turning the FET Q534 on and off to generate increase the magnitude of the bus voltage $V_{BUS}$) and disabled (e.g., rendering the FET Q534 non-conductive and allowing the magnitude of the bus voltage $V_{BUS}$ to decrease). When the magnitude of the bus voltage $V_{BUS}$ drops to a minimum bus voltage threshold $V_{B-MIN}$ (e.g., approximately 9 volts), the processor 541 may enable the flyback converter circuit 530 by generating the drive signal $V_{DR}$ via the comparator 544. As previously noted, the processor 541 may enable the flyback converter circuit 530 by actively turning the FET Q534 on and off to increase the magnitude of the bus voltage $V_{BUS}$. When the magnitude of the bus voltage $V_{BUS}$ rises to a maximum bus voltage threshold $V_{B-MAX}$ (e.g., approximately 11 volts), the processor 541 may disable the flyback converter circuit 540 by disabling the comparator 544 in order to render the FET Q534 non-conductive. Controlling the generation of the drive signal $V_{DR}$ in this manner allow the bus capacitor $C_{BUS}$ to charge much quicker than if the drive signal $V_{DR}$ is generated using the PFC technique (e.g., as in the normal mode of operation). Since the bus capacitor $C_{BUS}$ can charge up much quicker to the maximum bus voltage threshold $V_{B-MAX}$, the flyback converter circuit 530 only needs to be enabled for shorter periods of time leading to increased energy savings.

In some examples, the processor 541 may enable the flyback converter circuit 530 by generating the threshold voltage $V_{TH}$, and may disable the flyback converter circuit 530 by not generating the threshold voltage $V_{TH}$ or setting the threshold voltage $V_{TH}$ to zero volts. For instance, as noted above, when the magnitude of the sense voltage $V_{SNS}$ is less than the threshold voltage $V_{TH}$, the comparator 544 may drive the output high to cause the gate drive circuit 542 to render the FET Q534 conductive, thereby enabling the flyback converter circuit 530. And when the magnitude of the sense voltage $V_{SNS}$ exceeds the threshold voltage $V_{TH}$, the comparator 544 may drive the output low to cause the gate drive circuit 542 to render the FET Q524 non-conductive, thereby disabling the flyback converter circuit 530. So by not generating the threshold voltage $V_{TH}$ or setting the threshold voltage $V_{TH}$ to zero volts, the processor 541 may disable the flyback converter circuit 530.

Figure 8:
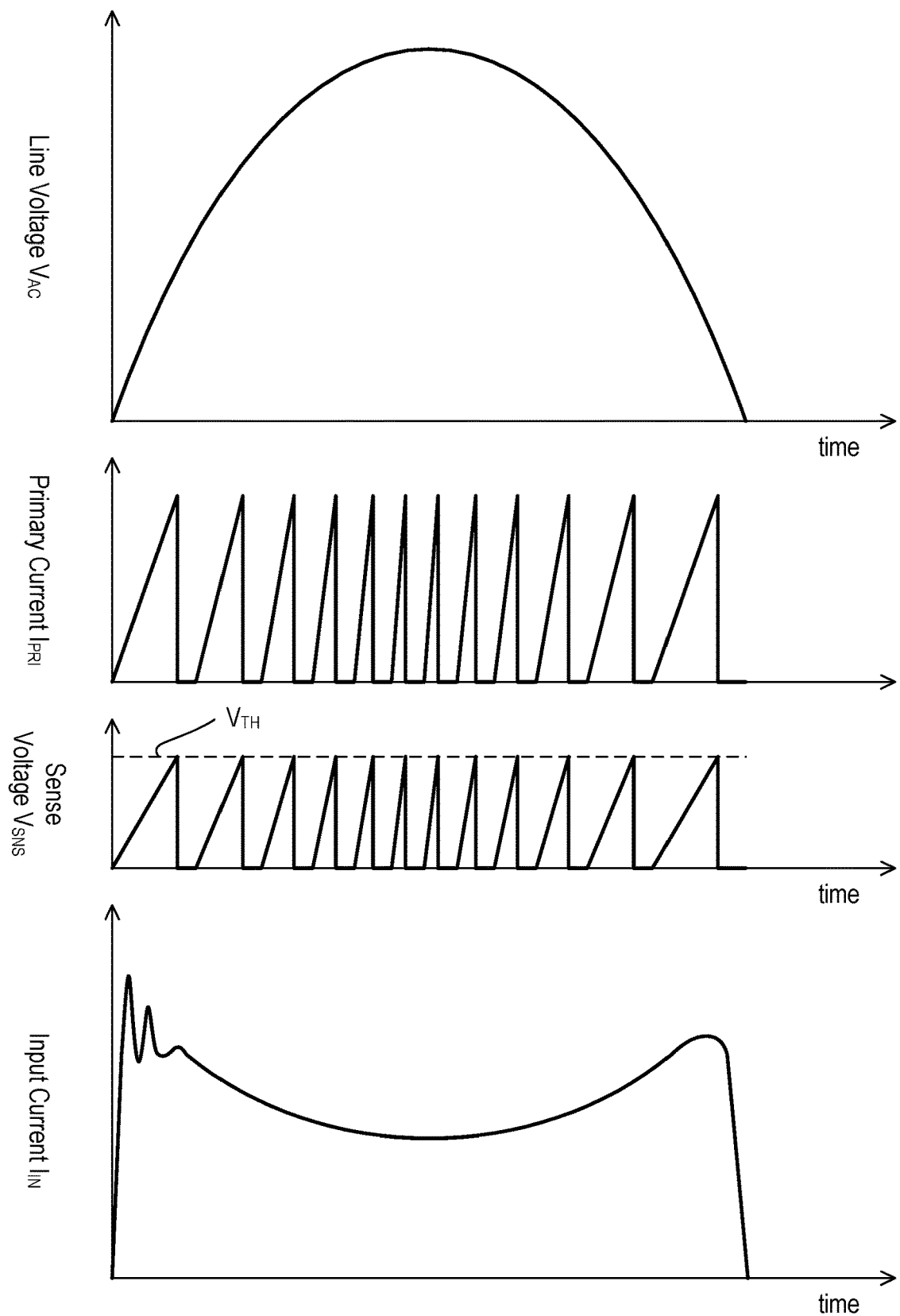

FIG. 8 shows example waveforms illustrating the operation of the power converter circuit 500 in the standby mode during a single half-cycle of the AC line voltage $V_{AC}$ when using a constant threshold voltage $V_{TH}$. As previously noted, when the magnitude of the sense voltage $V_{SNS}$ is less than the threshold voltage $V_{TH}$, the comparator 544 may drive the output high to cause the gate drive circuit 542 to render the FET Q534 conductive, and when the magnitude of the primary current $I_{PRI}$ increases to a point when the sense voltage $V_{SNS}$ is greater than or equal to the threshold voltage $V_{TH}$, the comparator 544 may drive the output low to cause the gate drive circuit 542 to render the FET Q524 non-conductive. In the example shown in FIG. 8, the power converter circuit 500 sets the threshold voltage $V_{TH}$ at a constant magnitude regardless of the instantaneous magnitude of the AC line voltage $V_{AC}$. That is, in the example shown in FIG. 8, the power converter circuit 500 does not change or adjust the threshold voltage $V_{TH}$ throughout the half-cycle of the AC line voltage $V_{AC}$.

The use of a constant magnitude for the threshold voltage $V_{TH}$ by the power converter circuit 500 may cause the input current $I_{IN}$ of the power converter circuit 500 to have a non-sinusoidal shape, such as the non-sinusoidal shape of the input current $I_{IN}$ illustrated in FIG. 8. The non-sinusoidal shape of the input current $I_{IN}$ can cause an audible noise, or ringing, in the inductors of the EMI filter circuit 510. The audible noise in the inductors of the EMI filter circuit 510 may be due to the inrush current at the beginning of each half-cycle of the AC line voltage $V_{AC}$. So, although the power converter circuit 500 may employ a standby mode when the electrical load is off to reduce power consumption, when the power converter circuit 500 is enabled during the standby mode to charge the bus capacitor $C_{BUS}$, the power converter circuit 500 may cause an undesired audible noise in the EMI filter circuit 510 when using a constant threshold voltage $V_{TH}$.

Figure 9:
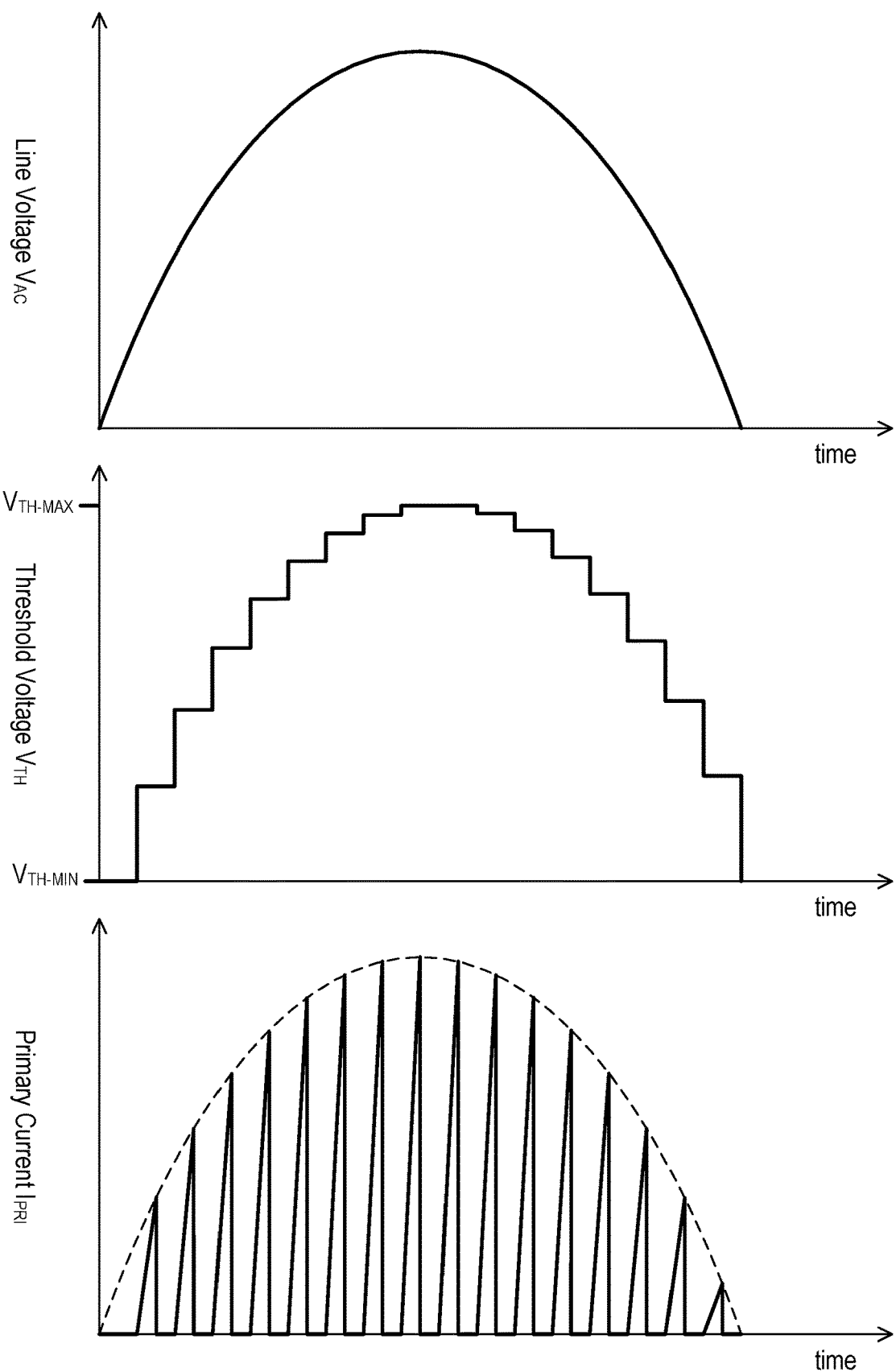

FIG. 9 shows example waveforms illustrating the operation of the power converter circuit 500 in the standby mode during a single half-cycle of the AC line voltage $V_{AC}$ when using a variable magnitude for the threshold voltage $V_{TH}$. When using a variable magnitude for the threshold voltage $V_{TH}$, the processor 541 may adjust the magnitude of the threshold voltage $V_{TH}$ based on the instantaneous magnitude of the AC line voltage $V_{AC}$ (e.g., as determined from the AC-magnitude signal $V_{AC\text{-}MAG}$). Further, when the flyback converter circuit 530 is enabled during the standby mode using a variable magnitude for the threshold voltage $V_{TH}$ that is based on the instantaneous magnitude of the AC line voltage $V_{AC}$, the processor 541 may control the generation of the drive signal $V_{DR}$ in a manner that makes the power converter circuit 500 appear as a resistive load to the AC power source. For example, when using a variable magnitude for the threshold voltage $V_{TH}$ that is based on the instantaneous magnitude of the AC line voltage, the magnitude of the input current $I_{IN}$ may be proportional to the AC line voltage $V_{AC}$, such as sinusoidal in shape (e.g., as shown by the input current $I_{IN}$ of FIG. 7), which may help to minimize or eliminate any audible noise generated in the inductors of the EMI filter circuit 510 as compared to the threshold $V_{TH}$ having a constant magnitude.

In some examples, the processor 541 may adjust the magnitude of the threshold voltage $V_{TH}$ between a minimum threshold voltage $V_{TH\text{-}MIN}$ and a maximum threshold voltage $V_{TH\text{-}MAX}$ based on the instantaneous magnitude of the AC line voltage $V_{AC}$. For example, the processor 541 may adjust the magnitude of the threshold voltage $V_{TH}$ as a function of the instantaneous magnitude of the AC line voltage $V_{AC}$ (e.g., $V_{TH}=V_{AC}^2/\alpha$), where $\alpha$ is a predetermined constant. The processor 541 may update the magnitude of the threshold voltage $V_{TH}$ each cycle of the power converter circuit 500. The magnitude of the threshold voltage $V_{TH}$ may increase from the beginning of the half-cycle until approximately the peak of the AC line voltage $V_{AC}$ and then begin to decrease until the end of the half-cycle. As such, the gate drive circuit 542 may render the FET Q534 conductive for longer durations during the beginning and end of the half-cycle than in the middle of the half-cycle. Since the magnitude of the threshold voltage $V_{TH}$ is a function of the magnitude of the AC line voltage $V_{AC}$, the peak magnitudes of the primary current $I_{PRI}$ may take on a sinusoidal shape (e.g., as shown in FIG. 9).

In some examples, the processor 541 may wait to generate the threshold voltage $V_{TH}$ until the next zero-crossing of the AC line voltage $V_{AC}$ in response to determining that the magnitude of the bus voltage $V_{BUS}$ dropped to the minimum bus voltage threshold $V_{B\text{-}MIN}$, for example, as shown in FIG. 7. However, in other examples, the processor 541 may enable the flyback converter circuit 530 during any point of the half-cycle of the AC line voltage $V_{AC}$. For example, when the magnitude of the bus voltage $V_{BUS}$ drops to the minimum bus voltage threshold $V_{B\text{-}MIN}$, the processor 541 may determine the magnitude of the threshold voltage $V_{TH}$ based on the instantaneous magnitude of the AC line voltage $V_{AC}$ and provide the threshold voltage $V_{TH}$ to the comparator 544 to enable the flyback converter circuit 530 regardless of whether or not the AC line voltage $V_{AC}$ is at a zero-crossing.

As noted above, in some embodiments the control elements of the flyback control circuit 540 may be implemented as part of the emitter module control circuit 436 of the lighting device 400, for example, as shown in FIG. 4. In addition, the control elements of the flyback control circuit 540 may be implemented as part of another control circuit (e.g., the lighting device control circuit 440), a dedicated flyback control integrated circuit, and/or one or more other control circuits or processors.

Figure 10A:
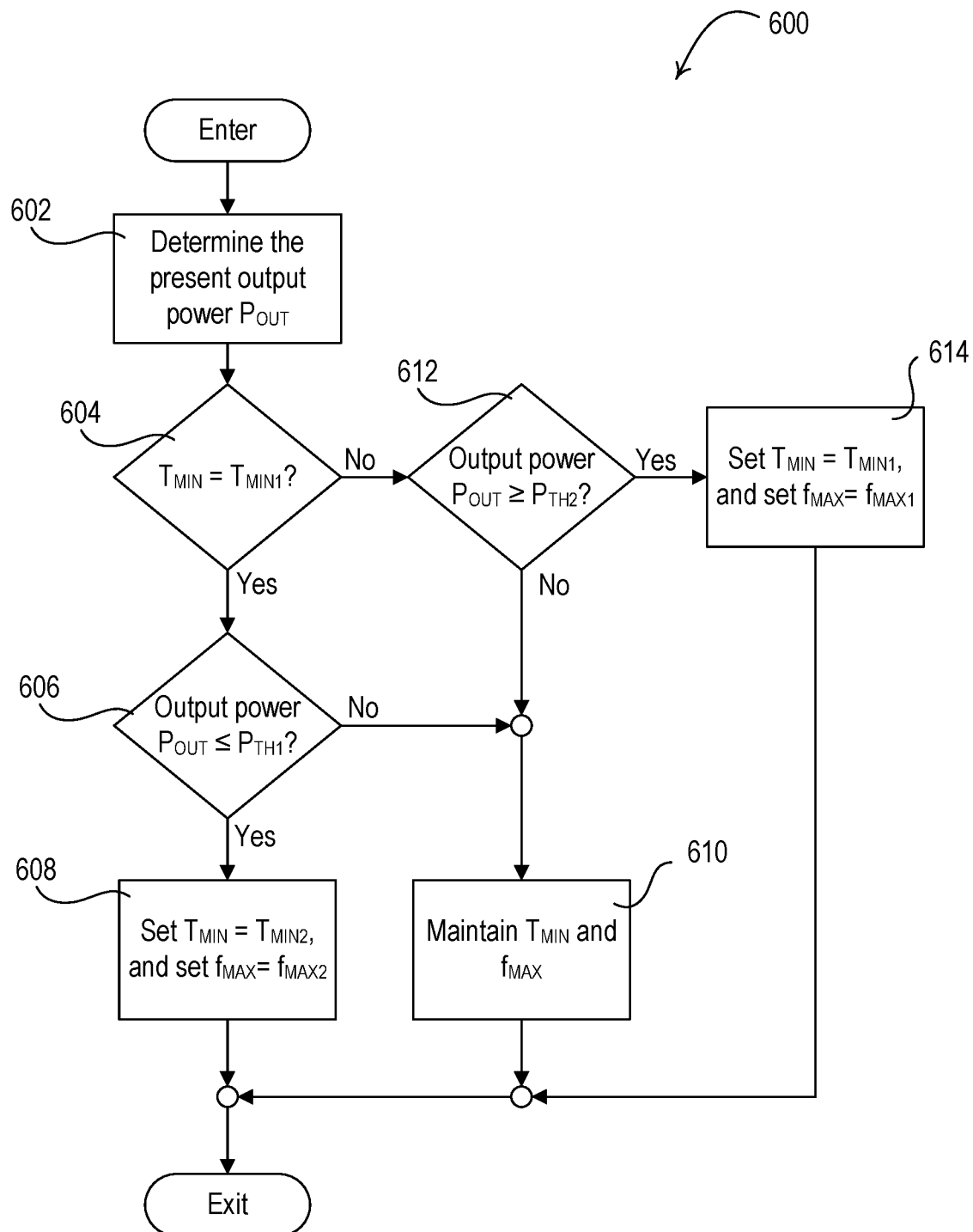
FIG. 10A is a flowchart of a procedure for setting a minimum operating period of a drive signal for controlling a semiconductor switch of a power converter circuit.

FIG. 10A is a flowchart of a procedure 600 for setting a minimum operating period $T_{MIN}$ of a drive signal $V_{DR}$ for controlling a semiconductor switch (e.g., a FET) of a power converter circuit (e.g., the power converter circuit 500). The procedure 600 may be performed by a control circuit, such as the flyback control circuit 540 (e.g., the processor 541 of the flyback control circuit 540) of the power converter circuit 500. The control procedure 600 may be performed periodically (e.g., every 60 seconds), and/or in response to a determination that an output power $P_{OUT}$ of the power converter is changing (e.g., due to a change to the intensity level of the lighting load). When performing the procedure 600, the control circuit may set the minimum operating period $T_{MIN}$ based on the output power $P_{OUT}$. At 602, the control circuit may determine the present output power $P_{OUT}$ of the power converter circuit. For example, the control circuit may be configured to determine the present output power $P_{OUT}$ in response to the present magnitude of a bus voltage $V_{BUS}$ across a bus capacitor of the power converter circuit, and the present magnitude of an output current $I_{OUT}$ of the power converter circuit (e.g., $P_{OUT}=V_{BUS} \cdot I_{OUT}$).

At 604, the control circuit may determine whether the minimum operating period $T_{MIN}$ is equal to a first value $T_{MIN1}$ (e.g., approximately 5 microseconds). If the control circuit determines that the minimum operating period $T_{MIN}$ is equal to the first value $T_{MIN1}$ at 604, the control circuit may then determine whether the output power $P_{OUT}$ is less than or equal to a first power threshold $P_{TH1}$ (e.g., approximately 7.5 W) at 606. If the control circuit determines that the output power $P_{OUT}$ is less than or equal to the first power threshold $P_{TH1}$ at 606, then the control circuit may set (e.g., increase) the minimum operating period $T_{MIN}$ to a second value $T_{MIN2}$ (e.g., approximately 10 microseconds) to set the maximum operating frequency $f_{MAX}$ to a second value $f_{MAX2}$ (e.g., approximately 100 kHz) at 608. If, however, the control circuit determines that the output power $P_{OUT}$ is greater than the first power threshold $P_{TH1}$ at 606, then the control circuit may maintain the minimum operating period $T_{MIN}$ at the first value $T_{MIN1}$ to maintain the maximum operating frequency $f_{MAX}$ at a first value $f_{MAX1}$ (e.g., approximately 200 kHz) at 610.

If the control circuit determines that the minimum operating period $T_{MIN}$ is not equal to the first value $T_{MIN1}$ at 604, the control circuit may then determine whether the output power $P_{OUT}$ is greater than or equal to a second power threshold $P_{TH2}$ (e.g., approximately 8 W) at 612. If the control circuit determines that the output power $P_{OUT}$ is greater than or equal to a second power threshold $P_{TH2}$, the control circuit may set (e.g., decrease) the minimum operating period $T_{MIN}$ to the first value $T_{MIN1}$ to set the maximum operating frequency $f_{MAX}$ to the first value $f_{MAX1}$ at 614. If, however, the control circuit determines that the output power $P_{OUT}$ is less than the second power threshold $P_{TH2}$ at 612, then the control circuit may maintain the minimum operating period $T_{MIN}$ at the second value $T_{MIN2}$ to maintain the maximum operating frequency $f_{MAX}$ at the second value $f_{MAX2}$ at 610. As such, using the procedure 600, the control circuit may adjust the minimum operating period $T_{MIN}$ of the power converter circuit based on the present output power $P_{OUT}$ of the power converter circuit 500 (e.g., as shown in FIG. 6B, which for example, may help avoid prolonged concentrations of EMI at one minimum operating frequency.

Figure 10B:
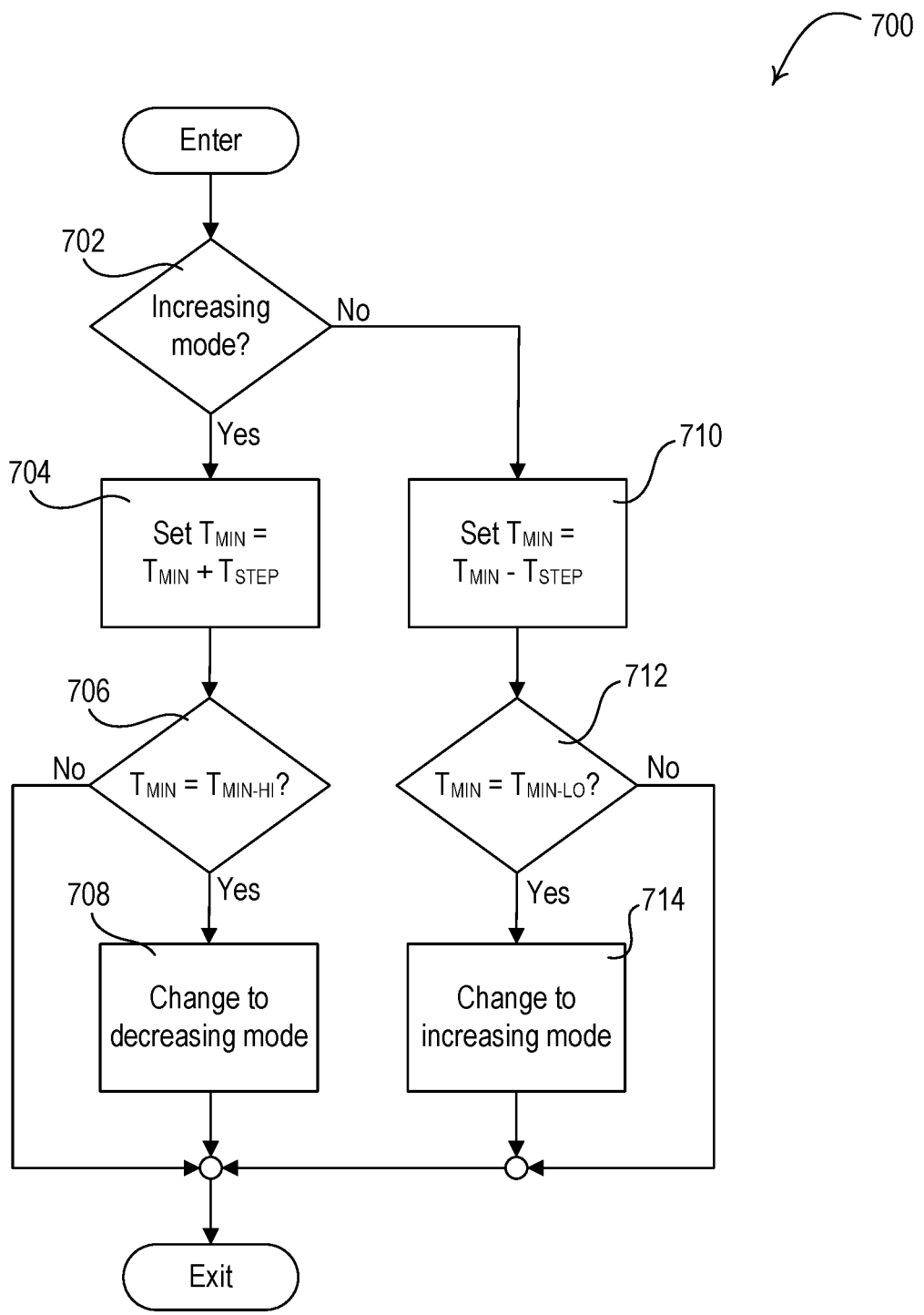
FIG. 10B is a flowchart of a procedure for adjusting, over time, a minimum operating period of a drive signal VDR for controlling a semiconductor switch of a power converter circuit.

FIG. 10B is a flowchart of a procedure 700 for adjusting, over time, a minimum operating period $T_{MIN}$ of a drive signal $V_{DR}$ for controlling a semiconductor switch (e.g., a FET) of a power converter circuit. The procedure 700 may be performed by a control circuit, such as the flyback control circuit 540 (e.g., the processor 541 of the flyback control circuit 540) of the power converter circuit 500. The control procedure 700 may be performed periodically (e.g., every 20 microseconds). The control procedure 700 may be performed continuously. Or, the control procedure 700 may be performed periodically, such as when an operating period $T_{OP}$ of the drive signal $V_{DR}$ is limited to the minimum operating period $T_{MIN}$ for at least a portion of a half-cycle of the AC line voltage $V_{AC}$. The control circuit may perform the control procedure 700 to adjust (e.g., dither) the minimum operating period $T_{MIN}$ over a range of periods with respect to time, such that the power converter circuit does not operate at a constant operating frequency $f_{OP}$ even when the operating period $T_{OP}$ is being limited to the minimum operating period $T_{MIN}$.

When performing the procedure 700, the control circuit may operate in an increasing mode, where the control circuit is configured to increase the operating period $T_{OP}$ of the drive signal $V_{DR}$ by predetermined increments of time, and operate in a decreasing mode, where the control circuit is configured to decrease the operating period $T_{OP}$ by predetermined increments of time. At 702, the control circuit may determine whether the control circuit is adjusting the operating period $T_{OP}$ in the increasing mode. For example, the control circuit may store the last used operating mode of the procedure 700, and use that mode when next executing the procedure 700. If the control circuit is adjusting the operating period $T_{OP}$ in the increasing mode at 702, the control circuit may set the minimum operating period $T_{MIN}$ equal to the present minimum operating period $T_{MIN}$ plus a step period $T_{STEP}$ (e.g., approximately 0.05-0.10 microseconds) at 704. At 706, the control circuit may determine whether the minimum operating period $T_{MIN}$ is equal to a high-end operating period value $T_{MIN-HI}$. If the control circuit determines that the minimum operating period $T_{MIN}$ is not equal to the high-end operating period value $T_{MIN-HI}$, the control circuit may exit the procedure 700 (e.g., and remain in the increasing mode). If, however, the control circuit determines that the minimum operating period $T_{MIN}$ is equal to the high-end operating period value $T_{MIN-HI}$, the control circuit may change to the decreasing mode at 708 and exit the procedure 700.

If the control circuit is adjusting the operating period $T_{OP}$ in decreasing mode at 702, the control circuit may set the minimum operating period $T_{MIN}$ equal to the present minimum operating period $T_{MIN}$ minus a step period $T_{STEP}$ (e.g., approximately 0.05-0.10 microseconds) at 710. The step period $T_{STEP}$ used when decreasing the minimum operating period $T_{MIN}$ at 710 may be the same, or different, from the step period $T_{STEP}$ used when increasing the minimum operating period $T_{MIN}$ at 704. At 712, the control circuit may determine whether the minimum operating period $T_{MIN}$ is equal to a low-end operating period value $T_{MIN-LO}$. If the control circuit determines that the minimum operating period $T_{MIN}$ is not equal to the low-end operating period value $T_{MIN-LO}$, the control circuit may exit the procedure 700 (e.g., and remain in the decreasing mode). If, however, the control circuit determines that the minimum operating period $T_{MIN}$ is equal to the low-end operating period value $T_{MIN-LO}$, the control circuit may change to increasing mode at 714 and exit the procedure 700. By adjusting (e.g., dithering) the minimum operating period $T_{MIN}$ with respect to time using the procedure 700, the control circuit may spread the EMI generated by the power converter circuit across different frequencies and eliminate a concentration of EMI at the maximum operating frequency $f_{MAX}$.

In some examples, a control circuit may perform the procedures 600 and 700 simultaneously. For example, the control circuit may set the minimum operating period $T_{MIN}$ of the drive signal $V_{DR}$ for the power converter circuit based on the output power $P_{OUT}$ using the procedure 600, and between adjustments of the minimum operating period $T_{MIN}$ using the procedure 600, the control circuit may make smaller adjustments (e.g., dither) of the minimum operating period $T_{MIN}$ over time using the procedure 700. As such, the control circuit may set a nominal minimum operating period $T_{MIN-NOM}$ to either the first value $T_{MIN1}$ or the second value $T_{MIN2}$ based on the procedure 600, and then adjust (e.g., dither) the nominal minimum operating period $T_{MIN-NOM}$ around the first value $T_{MIN1}$ or around the second value $T_{MIN2}$ over time based on the procedure 700. When enabled with a combination of both procedures 600 and 700, the control circuit is configured to further increase the spread of EMI generated by the power converter circuit across a greater number of different frequencies even when the control circuit is limited to operating at the minimal operating period $T_{MIN}$.

Figure 11:
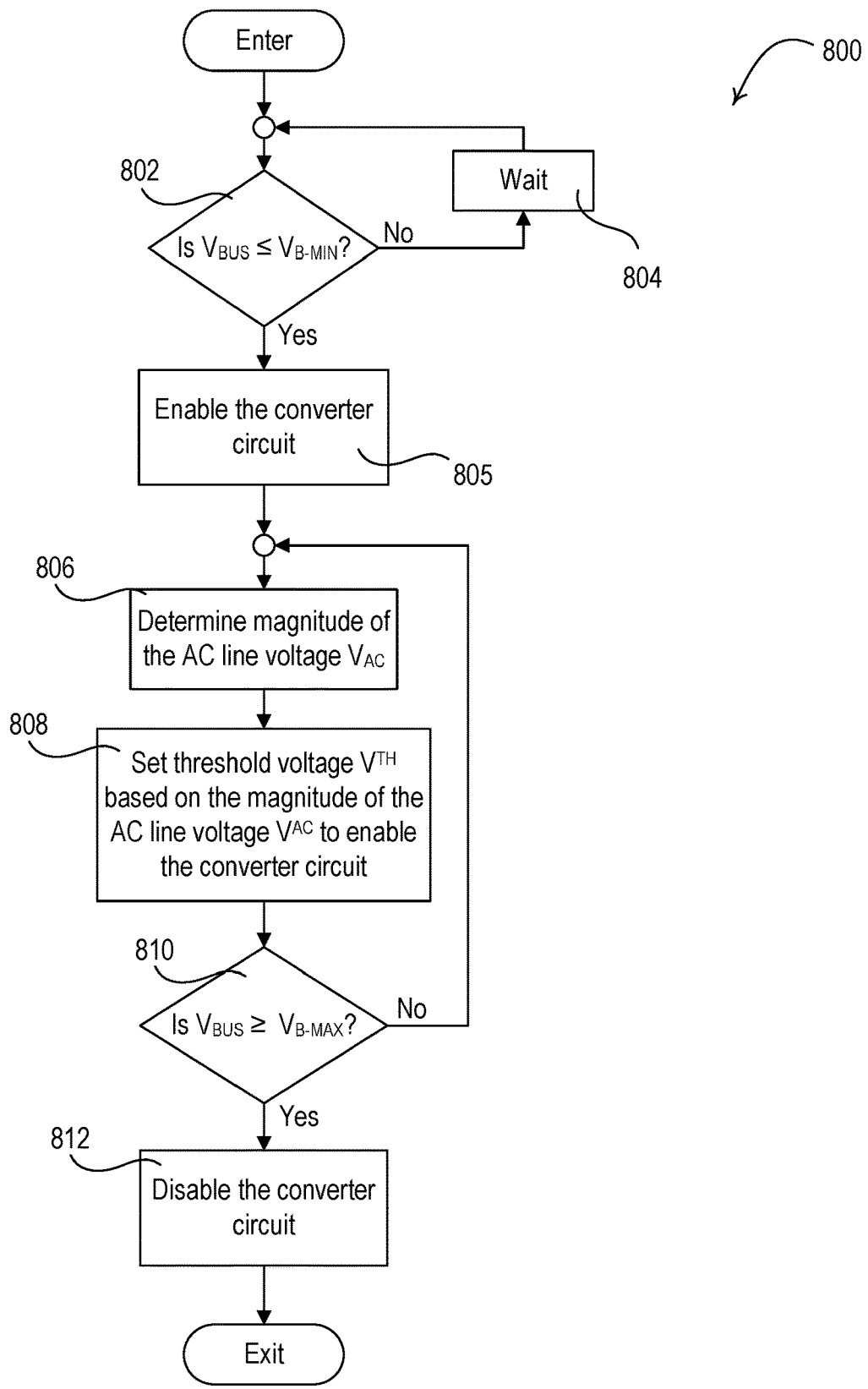
FIG. 11 is a flowchart of a procedure for generating a drive signal for controlling a semiconductor switch of a power converter circuit when operating in a standby mode.

FIG. 11 is a flowchart of a procedure 800 for generating a drive signal $V_{DR}$ for controlling a semiconductor switch (e.g., a FET) of a power converter circuit (e.g., power converter circuit 500) when operating in a standby mode. The procedure 800 may be performed by a control circuit, such as the flyback control circuit 540 (e.g., the processor 541 of the flyback control circuit 540) of the power converter circuit 500. The control circuit may perform the control procedure 800 periodically (e.g., every 20 microseconds) when the power converter circuit is operating in a standby mode. The power converter circuit may be configured to operate in a standby mode when the electrical load being controlled by the load control device is turned off. Further, when in the standby mode, the control device may turn off some portions of the power converter so that the power converter draws less power from AC power source. In some examples, the control circuit may perform the control procedure 800 to minimize or eliminate any audible noise generated in inductors of an EMI filter circuit of the load control device as compared to standby procedures than when the threshold $V_{TH}$ has a constant magnitude.

The power converter circuit may include a transformer, a semiconductor switch (e.g., a FET), and a bus capacitor. The transformer may include a primary window and a secondary window, where the primary winding of the transformer of the power converter circuit may be coupled in series with the semiconductor switch and the secondary winding may be coupled in series with the bus capacitor. The power converter circuit may generate a drive signal $V_{DR}$ for driving the semiconductor switch based on a comparison of a magnitude of a primary current of the transformer to a threshold voltage $V_{TH}$ (e.g., DC voltage). The magnitude of the threshold voltage $V_{TH}$ may be set based on an instantaneous magnitude of the AC line voltage $V_{AC}$. In some examples, the power converter circuit (e.g., the flyback control circuit 540 of the power converter circuit 500) may include a comparator for performing this comparison. The comparator may receive a sense voltage (e.g., the sense voltage $V_{SNS}$) at a negative input that indicates the magnitude of the primary current, and receive the threshold voltage $V_{TH}$ at a positive input. The output of the comparator may be coupled to a gate of the semiconductor switch via a gate drive circuit. When the magnitude of the sense voltage is less than the magnitude of the threshold voltage $V_{TH}$, the comparator may drive the output high to cause the gate drive circuit to render the semiconductor switch conductive. When the magnitude of the primary current increases to a point when the magnitude of the sense voltage is greater than or equal to the threshold voltage $V_{TH}$, the comparator may drive the output low to cause the gate drive circuit to render the semiconductor switch non-conductive. Further, it should be appreciated that in some examples, the power converter circuit may not include a comparator and the control circuit may perform the comparison of the magnitude of the primary current of the transformer to the threshold voltage digitally (e.g., executed in the processor 541 of the flyback control circuit 540).

When the procedure 800 begins, the semiconductor switch of the power converter circuit may be rendered non-conductive and a bus voltage $V_{BUS}$ of the bus capacitor of the power converter circuit may be decreasing. At 802, the control circuit may determine whether the magnitude of the bus voltage $V_{BUS}$ is less than or equal to a minimum bus voltage threshold $V_{B-MIN}$ (e.g., approximately 9 volts). The control circuit may receive a bus voltage feedback signal $V_{B-FB}$ from the power converter circuit that indicates the present magnitude of the bus voltage $V_{BUS}$. If the control circuit determines that the magnitude of the bus voltage $V_{BUS}$ is greater than the minimum bus voltage threshold $V_{B-MIN}$, the control circuit may wait at 804 and then return to 802. Once the magnitude of the bus voltage $V_{BUS}$ decreases to or below the minimum bus voltage threshold $V_{B-MIN}$, the control circuit may enable the converter circuit at 805. The control circuit may enable the power converter circuit (e.g., the flyback converter circuit 530) by actively turning the semiconductor switch on and off to increase the magnitude of the bus voltage $V_{BUS}$. The control circuit may then determine the instantaneous magnitude of the AC line voltage $V_{AC}$ at 806. The control circuit may receive an AC-magnitude signal that indicates an instantaneous magnitude of the AC line voltage $V_{AC}$.

At 808, the control circuit may set the magnitude of the threshold voltage $V_{TH}$ provided to the positive input of the comparator based on the magnitude of the AC line voltage $V_{AC}$. For example, the control circuit may set the magnitude of the threshold voltage $V_{TH}$ as a function of the instantaneous magnitude of the AC line voltage $V_{AC}$ (e.g., $V_{TH}=V_{AC}^2/\alpha$), where $\alpha$ is a predetermined constant. At 810, the control circuit may determine whether the bus voltage $V_{BUS}$ is greater than or equal to a maximum bus voltage threshold $V_{B-MAX}$ (e.g., approximately 11 volts). If the control circuit determines that the bus voltage $V_{BUS}$ is less than the maximum bus voltage threshold $V_{B-MAX}$ at 810, the control procedure may return to 806. When the control circuit returns to 806, the control circuit may adjust the magnitude of the threshold voltage $V_{TH}$ between a minimum threshold voltage $V_{TH-MIN}$ and a maximum threshold voltage $V_{TH-MAX}$ based on the instantaneous magnitude of the AC line voltage $V_{AC}$ at 806 and 808. In some examples, the control circuit may update the magnitude of the threshold voltage $V_{TH}$ each cycle of the power converter circuit. That is, the control circuit may repeat the loop from 806, to 808, to 810, and back to 806 each cycle of the power converter circuit. In some examples, the magnitude of the threshold voltage $V_{TH}$ may increase from the beginning of the half-cycle until approximately the peak of the AC line voltage $V_{AC}$ and then begin to decrease until the end of the half-cycle.

When the power converter circuit is enabled during the standby mode using a variable threshold voltage $V_{TH}$ that is based on the instantaneous magnitude of the AC line voltage $V_{AC}$, the control circuit may control the generation of the drive signal $V_{DR}$ such that the power converter circuit appears as a resistive load to the AC power source. That is, the magnitude of the threshold voltage $V_{TH}$ may be a function of the magnitude of the AC line voltage $V_{AC}$, and the peak magnitudes of the primary current $I_{PRI}$ may take on a sinusoidal shape (e.g., as shown in FIG. 9), which causes the power converter circuit to appear as a resistive load to the AC power source.

Finally, when the magnitude of the bus voltage $V_{BUS}$ is equal to or greater than the maximum bus voltage threshold $V_{B\text{-}MAX}$ at 810, the control circuit may disable the power converter circuit by disabling the comparator in order to render the semiconductor switch non-conductive at 812 and the procedure 800 may exit. For example, the control circuit may disable the power converter by setting the threshold voltage $V_{TH}$ to zero volts. After exiting the procedure 800, the control circuit may repeat the procedure 800 if, for example, the power converter circuit is still operating in the standby mode.

What is claimed is:

1. A power converter circuit configured to generate a bus voltage for powering an electrical load, the power converter circuit comprising:
    a bus capacitor configured to store the bus voltage;
    a semiconductor switch configured to be rendered conductive and non-conductive to charge the bus capacitor;
    a control circuit configured to generate a drive signal for rendering the semiconductor switch conductive and non-conductive, such that the drive signal is characterized by an operating period, the control circuit configured to limit the operating period to a minimum operating period;
    wherein the control circuit is configured to determine an output power of the power converter circuit, the control circuit further configured to adjust the minimum operating period to a first value when the output power is greater than a first threshold and to a second value when the output power is less than a second threshold.

2. The power converter circuit of claim 1, further comprising:
    a transformer having a primary winding coupled in series with the semiconductor switch, and a secondary winding coupled in series with the bus capacitor;
    wherein the processor is configured to render the semiconductor switch conductive to conduct a primary current through the primary winding to store energy in the transformer, and to render the semiconductor switch non-conductive to conduct a secondary current through the secondary winding to charge the bus capacitor.

3. The power converter circuit of claim 1, wherein the control circuit is configured to adjust the minimum operating period with respect to time in a range between a high value and a low value.

4. The power converter circuit of claim 1, wherein the first threshold is greater than the second threshold.

5. The power converter circuit of claim 1, wherein the first and second thresholds are equal.

6. The power converter circuit of claim 1, wherein the control circuit is configured to determine the output power based on a current conducted by the electrical load and a magnitude of the bus voltage.

7. The power converter circuit of claim 1, wherein the control circuit is configured to adjust an operating frequency of the drive signal throughout the duration of a half-cycle of an AC line voltage.

8. The power converter circuit of claim 7, wherein the control circuit is configured to decrease the operating frequency of the drive signal as an instantaneous magnitude of the AC line voltage increases towards a peak magnitude and increase the operating frequency of the drive signal as the instantaneous magnitude of the AC line voltage decreases towards zero during a second half of the half-cycle of the AC line voltage.

9. The power converter circuit of claim 1, wherein the control circuit is configured to decrease the operation period of the drive signal as the output power decreases.

10. The power converter circuit of claim 1, wherein, when the output power is greater than the first threshold, the control circuit is configured to set the nominal minimum operating period to the first value, and adjust the minimal operating period with respect to time in range between a first upper value that is greater than the nominal operating period and a first lower value that is less than the nominal operating period;
    wherein, when the output power is less than the second threshold, the control circuit is configured to set the nominal minimum operating period to the second value, and adjust the minimal operating period with respect to time in range between a second upper value that is greater than the nominal operating period and a second lower value that is less than the nominal operating period.

11. A power converter circuit configured to generate a bus voltage for powering an electrical load, the power converter circuit comprising:
    a bus capacitor configured to store the bus voltage;
    a semiconductor switch configured to be rendered conductive and non-conductive to charge the bus capacitor;
    a control circuit configured to:
    generate a drive signal for rendering the semiconductor switch conductive and non-conductive to charge the bus capacitor, wherein the drive signal is characterized by an operating period that is limited to a minimum operating period;
    determine an output power of the power converter circuit;
    determine a nominal minimum operating period based on the output power of the power converter circuit; and
    adjust the minimum operating period for the drive signal with respect to time in a range between an upper value that is greater than the nominal operating period and a lower value that is less than the nominal operating period.

12. The power converter circuit of claim 11, wherein, when the output power is greater than a first threshold, the control circuit is configured to set the nominal minimum operating period to a first value, and adjust the minimal operating period with respect to time in range between a first upper value that is greater than the nominal operating period and a first lower value that is less than the nominal operating period;
    wherein, when the output power is less than a second threshold, the control circuit is configured to set the nominal minimum operating period to a second value, and adjust the minimal operating period with respect to time in range between a second upper value that is greater than the nominal operating period and a second lower value that is less than the nominal operating period.

13. The power converter circuit of claim 11, wherein the control circuit is configured to determine the output power based on a current conducted by the electrical load and a magnitude of the bus voltage.

14. The power converter circuit of claim 11, further comprising:
    a transformer having a primary winding coupled in series with the semiconductor switch, and a secondary winding coupled in series with the bus capacitor;

wherein the processor is configured to render the semiconductor switch conductive to conduct a primary current through the primary winding to store energy in the transformer, and to render the semiconductor switch non-conductive to conduct a secondary current through the secondary winding to charge the bus capacitor.

15. The power converter circuit of claim 11, wherein the control circuit is configured to decrease the operation period of the drive signal as the output power decreases.

16. A power converter circuit configured to generate a bus voltage for powering an electrical load, the power converter circuit comprising:
   a bus capacitor configured to store the bus voltage;
   a semiconductor switch configured to be rendered conductive and non-conductive to charge the bus capacitor;
   a control circuit configured to determine an output power of the power converter circuit, and generate a drive signal for rendering the semiconductor switch conductive and non-conductive to charge the bus capacitor, wherein the drive signal is characterized by an operating period that is limited to a minimum operating period;
   wherein, when the output power is greater than a first threshold, the control circuit is configured to adjust the minimal operating period with respect to time in a range between a first upper value that is greater than a first operating period value and a first lower value that is less than the first operating period value; and
   wherein, when the output power is less than a second threshold, the control circuit is configured to adjust the minimal operating period with respect to time in range between a second upper value that is greater than a second operating period value and a second lower value that is less than the second operating period value.

17. The power converter circuit of claim 16, wherein the control circuit is configured to determine the output power based on a current conducted by the electrical load and a magnitude of the bus voltage.

18. The power converter circuit of claim 16, further comprising:
   a transformer having a primary winding coupled in series with the semiconductor switch, and a secondary winding coupled in series with the bus capacitor;
   wherein the processor is configured to render the semiconductor switch conductive to conduct a primary current through the primary winding to store energy in the transformer, and to render the semiconductor switch non-conductive to conduct a secondary current through the secondary winding to charge the bus capacitor.

19. The power converter circuit of claim 16, wherein the control circuit is configured to decrease the operation period of the drive signal as the output power decreases.

20. The power converter circuit of claim 16, wherein, when operating in a critical conduction mode, the control circuit is configured to generate a zero cross detect signal to indicate when the magnitude of the secondary current drops to approximately zero amps, and render the semiconductor switch conductive when the magnitude of the secondary current drops to zero amps.

* * * * *